US012227303B2

(12) United States Patent
 Bastiyali

(10) Patent No.: US 12,227,303 B2
(45) Date of Patent: Feb. 18, 2025

(54) AIR TAXI POD TERMINALS AND METHODS

(71) Applicant: Tarkan Bastiyali, New York, NY (US)

(72) Inventor: Tarkan Bastiyali, New York, NY (US)

( * ) Notice: Subject to any disclaimer, the term of this patent is extended or adjusted under 35 U.S.C. 154(b) by 544 days.

(21) Appl. No.: 17/451,427

(22) Filed: Oct. 19, 2021

(65) Prior Publication Data

US 2023/0124771 A1  Apr. 20, 2023

(51) Int. Cl.
 *B64F 1/00* (2024.01)
 *B63B 35/50* (2006.01)
 *E01F 3/00* (2006.01)

(52) U.S. Cl.
 CPC ............... *B64F 1/00* (2013.01); *B63B 35/50* (2013.01); *E01F 3/00* (2013.01)

(58) Field of Classification Search
 CPC .... B64F 1/00; B64F 1/36; B64F 1/002; B64F 1/007; B64F 1/221; E01F 3/00; B63B 35/50; B63B 35/53; B63B 35/38; B63B 1/14; B63B 35/52; B63B 35/4413; B63B 75/00; B63B 2035/4426; B63B 2035/4433; B63B 2035/4473; B63B 2035/448; B63B 2035/4486; B63B 2035/4493; B64G 5/00; B64G 2005/005; B63G 11/00; E02B 17/0004
 USPC ...................................... 114/261; 244/114 R
 See application file for complete search history.

(56) References Cited

U.S. PATENT DOCUMENTS

| | | | | | |
|---|---|---|---|---|---|
| 2,092,250 | A | * | 9/1937 | Hagan | B63B 35/50 114/261 |
| 2,107,886 | A | * | 2/1938 | Creed | B63B 35/50 114/261 |
| 2,133,721 | A | * | 10/1938 | Seidman | B64F 1/221 104/44 |
| 3,503,357 | A | * | 3/1970 | Ferris | B63B 35/50 114/262 |
| 3,599,589 | A | * | 8/1971 | Busey | B63B 1/041 976/DIG. 151 |
| 4,799,828 | A | * | 1/1989 | Georgii | E02B 17/00 405/203 |
| 5,839,693 | A | * | 11/1998 | Stalaw | B63B 35/50 244/114 R |
| 6,827,032 | B1 | * | 12/2004 | Wobben | E02B 17/025 114/230.1 |

(Continued)

FOREIGN PATENT DOCUMENTS

CN  104118539 A  * 10/2014
CN  204021216 U  * 12/2014

(Continued)

*Primary Examiner* — Joshua E Rodden
(74) *Attorney, Agent, or Firm* — Lerner David LLP

(57) ABSTRACT

An air-taxi pod system floats on a lake, river, sea, etc. and has a spoke connected between a base and an air pod. The pod is configured as a landing region for air taxi within larger metropolitan cities. Each of the spoke, base, and pod use a hull section to provide the buoyancy necessary for each of these components to float. In some versions, two or more, such as six spokes sit around a base connected to the base with connections that can withstand heavy storms. An air pod or separately an air-ship pod connect to some of the spokes at second ends of the spokes with a similar connection. The system can also have terminals or terminal buildings to facilitate travel or commuting.

3 Claims, 52 Drawing Sheets

(56) References Cited

U.S. PATENT DOCUMENTS

| | | | | |
|---|---|---|---|---|
| 8,424,802 | B2* | 4/2013 | Tripier-Larivaud | B64F 1/007 |
| | | | | 244/116 |
| 8,662,000 | B2* | 3/2014 | Vandenworm | B63B 21/50 |
| | | | | 114/263 |
| 11,072,401 | B2* | 7/2021 | Becher | E02B 17/0004 |
| 11,833,871 | B2* | 12/2023 | Hwang | B60F 5/003 |
| 2013/0202446 | A1* | 8/2013 | Siegfriedsen | F03D 80/50 |
| | | | | 416/244 A |
| 2018/0170489 | A1* | 6/2018 | Dziewolski | H02S 40/425 |
| 2019/0202530 | A1* | 7/2019 | Rikoski | B63B 22/04 |
| 2019/0235525 | A1* | 8/2019 | Cooper | B63B 45/04 |
| 2023/0124771 | A1* | 4/2023 | Bastiyali | B64F 1/36 |
| | | | | 244/114 R |
| 2024/0201418 | A1* | 6/2024 | Itami | B64U 10/60 |

FOREIGN PATENT DOCUMENTS

| | | | | | |
|---|---|---|---|---|---|
| CN | 105984559 | A | * | 10/2016 | |
| CN | 111605673 | A | * | 9/2020 | A01K 61/60 |
| CN | 111802295 | A | * | 10/2020 | A01K 61/60 |
| CN | 111820164 | A | * | 10/2020 | A01K 61/60 |
| FR | 3072980 | A1 | * | 5/2019 | B63B 35/44 |
| KR | 2016135063 | A | * | 11/2016 | B63B 35/50 |
| WO | WO-2010074493 | A2 | * | 7/2010 | B63B 35/44 |
| WO | WO-2015133661 | A1 | * | 9/2015 | B63B 35/53 |

\* cited by examiner

AIR TAXI POD TERMINALS AND METHODS

BACKGROUND

Major companies have announced air Taxis. These craft must have a way to land or have terminals. Current proposals include air taxis land on building rooftops. Many helicopters have crashed into buildings in recent years, most recently in NYC on Jun. 10, 2019. From these past accidents, people in the craft and on the street were hurt or killed. In Brazil, it's common for helicopters to land on rooftops, and many articles describe them as crash landings. Current proposals will increase such crashes, which will result in fewer people wanting to use air taxi services.

Current proposals include building sky pods in centers of major cities. But finding vacant land in a major city such as New York, London, or Paris is almost impossible since every inch of these cities has already been built out. Constructing centrally located sky pods will require buying expensive buildings and will incur the costs of buying out tenants with long leases. Such endeavors usually lead to lengthy lawsuits that will delay these projects for years. Construction material and labor costs have increased and will continue to increase substantially over the years, making current proposals even less economically feasible.

SUMMARY

An air-taxi pod system with a base having a base hull, a pod having a pod hull and an air-taxi landing area, and a spoke, having a spoke hull, disposed between the base and the pod. The spoke and the pod connect through a spoke-pod connection, and the base and the spoke connect through a spoke-base connection. In various versions, these connections are designed to withstand 50-100 mile per hour winds or the waves created by 50-100 mile per hour winds.

Various versions may have landing lights distributed around the landing area, terminals, and spoke walkways extending from the pod to the base.

Some versions of the system have multiple pods, one or more airship pods, or both connected to various spokes extending out from the base. And sometimes the various floating components have water taxi docks to enable travelers to switch transportation modes to or from water taxis. These docks are at least designed to ease pedestrian entrance to or exit from a water taxi.

Some versions have facilities for commuter use distributed on a first-come-first-served basis or reservable, and can include bathroom, shower, or sleeping spaces. Restaurant space can also be found on a pod, an airship pod, or the base.

The area of the base can be increased by supplying infills disposed between two or more of the spokes. In some cases, the infills are suspended from the spokes, and in some cases the infill has a matching infill hull.

DETAILED DESCRIPTION

Figure 1:
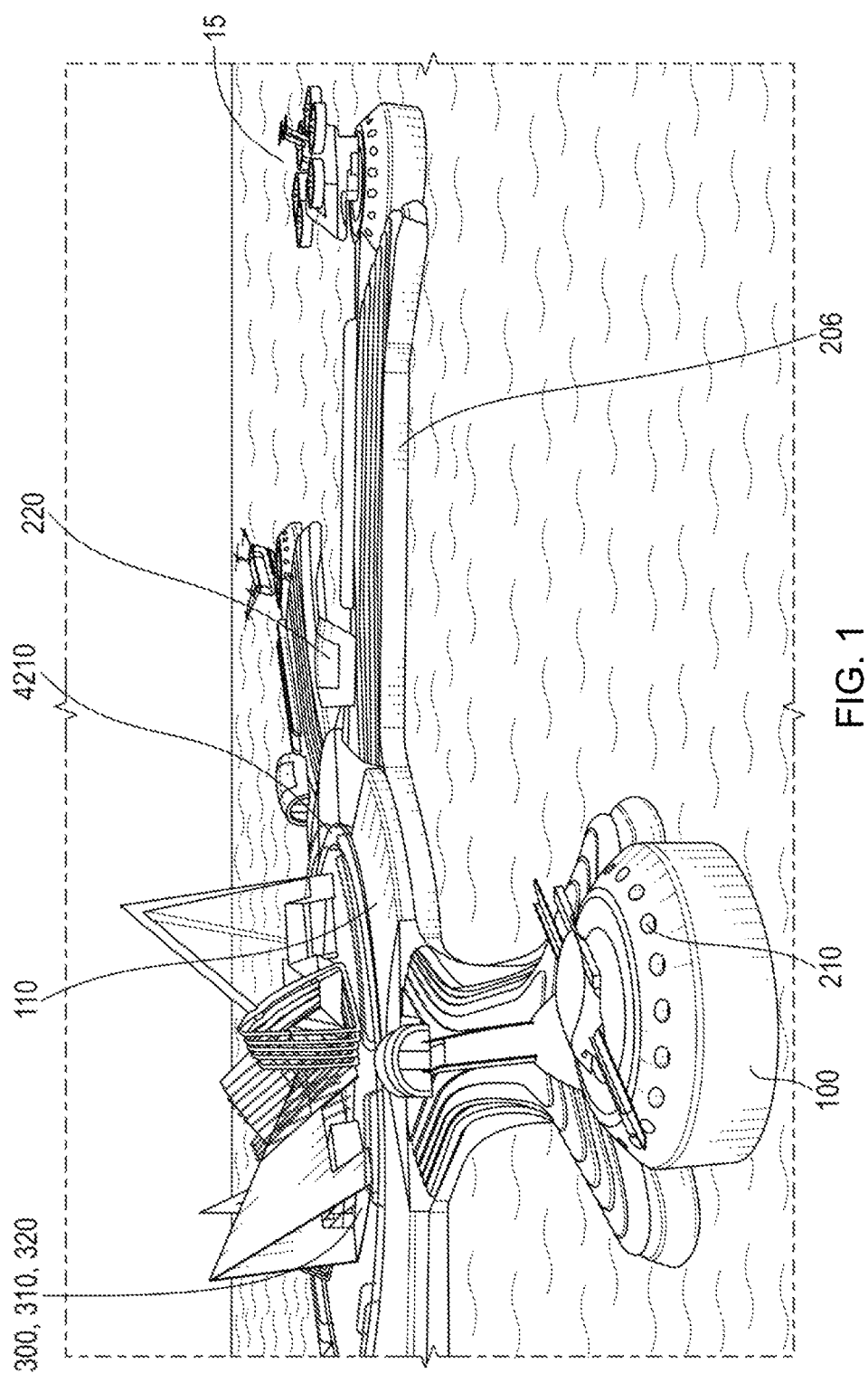
FIG. 1 depicts a perspective view of an air taxi landing system.

Unless defined otherwise, all technical and scientific terms used in this document have the same meanings as commonly understood by one skilled in the art to which the disclosed invention pertains. Singular forms—a, an, and the—include plural referents unless the context clearly indicates otherwise. Thus, reference to "fluid" refers to one or more fluids, such as two or more fluids, three or more fluids, etc. When an aspect is said to include a list of components, the list is representative. If the component choice is specifically limited to the list, the disclosure will say so. Moreover, listing components acknowledges that exemplars exist for each of the components and any combination of the components—including combinations that specifically exclude any one or any combination of the listed components. For example, "component A is chosen from A, B, or C" discloses exemplars with A, B, C, AB, AC, BC, and ABC. It also discloses (AB but not C), (AC but not B), and (BC but not A) as exemplars, for example. Combinations that one of ordinary skill in the art knows to be incompatible with each other or with the components' function in the invention are excluded from the invention, in some exemplars.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on", "directly engaged to", "directly connected to" or "directly coupled to" another element or layer, there may be no intervening elements or layers present. Other words used to describe the relationship between elements should be interpreted in a like fashion (e.g., "between" versus "directly between", "adjacent" versus "directly adjacent", etc.).

Although the terms first, second, third, etc. may be used to describe various elements, components, regions, layers, or sections, these elements, components, regions, layers, or sections should not be limited by these terms. These terms may be only used to distinguish one element, component, region, layer, or section from another region, layer, or section. Terms such as "first", "second", and other numerical terms do not imply a sequence or order unless indicated by the context. Thus, a first element, component, region, layer, or section discussed below could be termed a second element, component, region, layer, or section without departing from this disclosure.

Spatially relative terms, such as "inner", "outer", "beneath", "below", "lower", "above", "upper" and the like, may be used for ease of description to describe one element or feature's relationship to another element or feature as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors interpreted accordingly.

The description of the exemplars has been provided for purposes of illustration and description. It is not intended to be exhaustive or to limit the invention. Individual elements or features of a particular exemplar are generally not limited to that exemplar but, where applicable, are interchangeable and can be used in a selected exemplar, even if not explicitly shown or described. The same may also be varied in many ways. Such variations are not a departure from the invention, and all such modifications are included within the invention's scope.

7 River, Ocean, Lake, Sea
8 bridge
15 air taxi
20 taxi boat
30 fuel pump or electric recharging station
51 boat
81 elevator
95 air taxi landing system
100 air taxi pod
110 base hull
111 pod hull
120 base
130 dock
200 marked landing areas
205 spoke
206 spoke hull
210 LED lights
215 spoke walkway
220 terminal or landing pod terminal
240 airship pod
241 airship
250 side bubble exit
300 restroom-bathroom
310 restroom stalls
320 shower
330 kitchen
2710 hanger
3310 infills
3311 artificial grass
4000 glass dome
4010 hologram ads
4210 circular moving walkway With my air taxi landing system 95, any air taxi or drone taxi carrying commuters will be able to land safely on the air taxi pod 100. Pod 100 could be on water bodies such as a river, lake, sea, bay, or ocean 7. In some versions, pod 100 is a metal structure that could be the same height as a standard barge ship and look like a piece of art on the water. It could be lit up with colors, such as magenta, recessed along the sides and waterline to give base 120 a grand look at night in some versions. The technology used to light up the water along the waterline of a yacht can be implemented with base 120 to enhance the ambiance at night. Base 120 can be any color, such as silver or black metal. Base 120 may increase the real estate value of apartments with water views since it will be an attractive piece of art on the water; the water now only shows pitch black at night. Also, the planned air taxis 15 coming to the market are supposed to be quiet. So, watching them land should be a beautiful scene. (See FIGS. 1, 2, 3, 4).

Since almost all major cities are on the water, landing system 95 can work practically anywhere, especially when air taxi travel becomes as large a business as it is expected to become. Major cities such as New York, London, and Paris will get more populated over time, making vehicle traffic an even bigger issue. With pods 100, executives may travel much more quickly than they currently can and hence be more productive, saving corporations money.

Using landing system 95 avoids the need to buy a property and deal with potential lawsuits from tenants. In some versions, cities could allow private ownership of pods 100 and rent the owners water space and tax pods 100. Having landing system 95 built is a win-win for everyone. The city will collect taxes, the public will save on travel time, and pod 100 owners will generate income year-round. Pod owners can rent pods 100 to different carriers. Also, restaurants, Cafè's, and shops will be located on pod 100, in some versions. Air taxi repair shops could rent space on air pod 100, and taxi boats 20 rent could rent slips to dock on pod 100.

The use of river space for air taxi landing pod 100 is better used for seaplane landings. In some cities, seaplane landing is seasonal. But air taxi landing pod 100 would be used year-round.

Current proposals also show systems in which air taxis 15 land dangerously close to each other. But pods 100 separate the taxis a safe distance from each other. Pod 100 can have recessed LED lights 210 (such as magenta) to shoot up into the sky to alert the pilot of where they should land. In some versions, these lights illuminate automatically when air taxi is a few miles away from pod 100. A huge advantage of landing system 95 is that the entire landing system 95 can be relocated.

The current proposals spend a fortune on a location, but when that location later becomes undesirable, the owners won't make it work or close it down.

Landing system 95 can be moved should economic conditions call for that.

The traveler will be able to download an air taxi app to a smartphone device.

The traveler will be able to book short air taxi flights from pods 100 to major connecting transportation hubs, such as train stations, stadiums, and airports. This should also reduce traffic in these cities.

For instance, in the event the city has multiple airports, the commuter will take a short flight from pod 100 to one of the major city airports. For instance, a commuter in NYC will have the option to take an air taxi from, for example, south of Battery Park to one of the major city airports such as LaGuardia, Newark, and JFK. Each pod 100 can be dedicated to a different flight path. For instance, if landing system 95 has four pods 100, then a first pod 100 could be dedicated to LaGuardia airport, a second pod 100 to Newark airport, a third pod 100 to West Port CT, a fourth pod 100 to JFK, a fifth pod 100 to Atlantic City, a sixth pod 100 to Shelter Island, etc.

Figure 2:
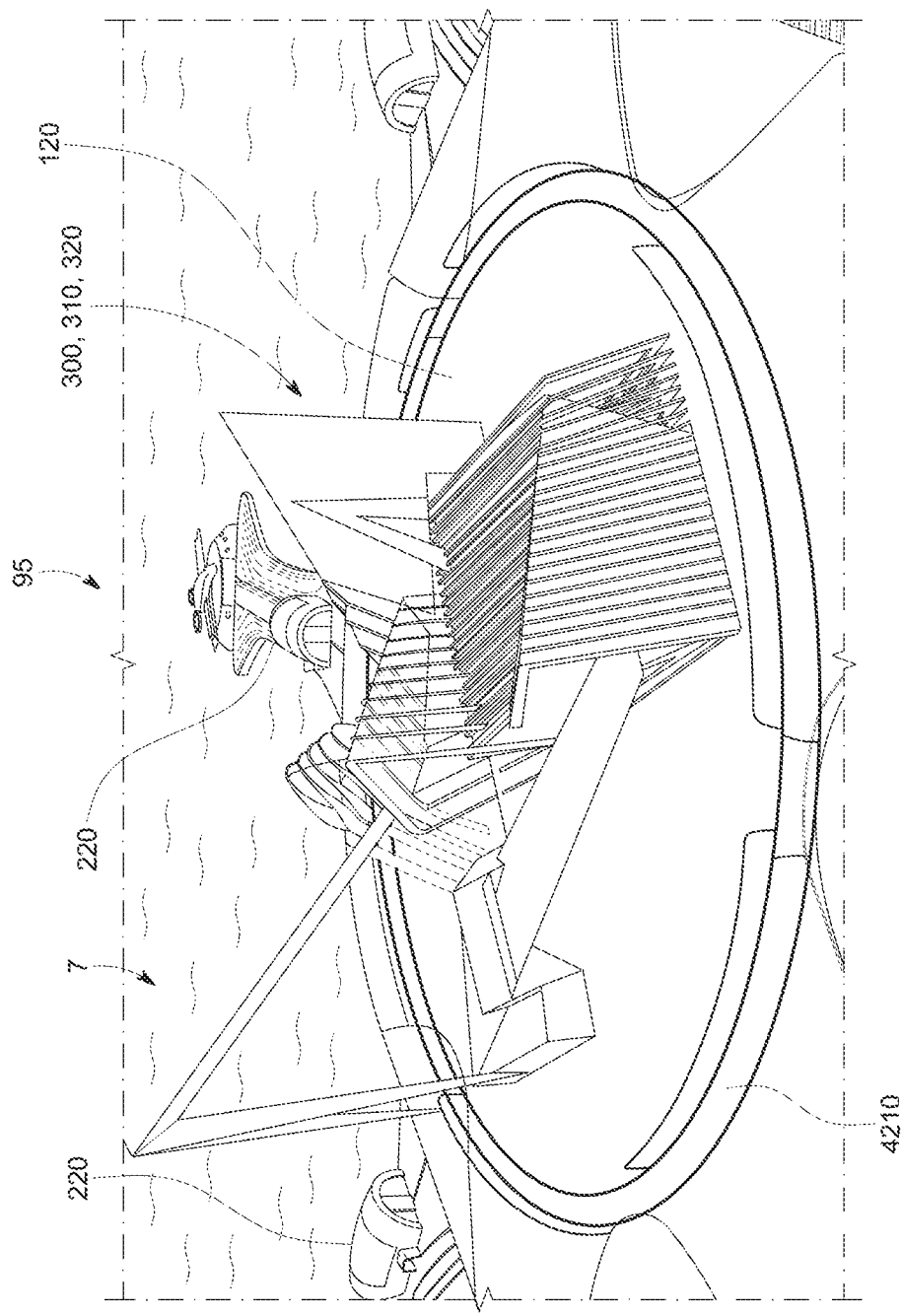
FIG. 2 depicts a perspective view of another landing system.

FIGS. 1-2 show a close-up of landing system 95 shown located at Battery Park.

Figure 3:
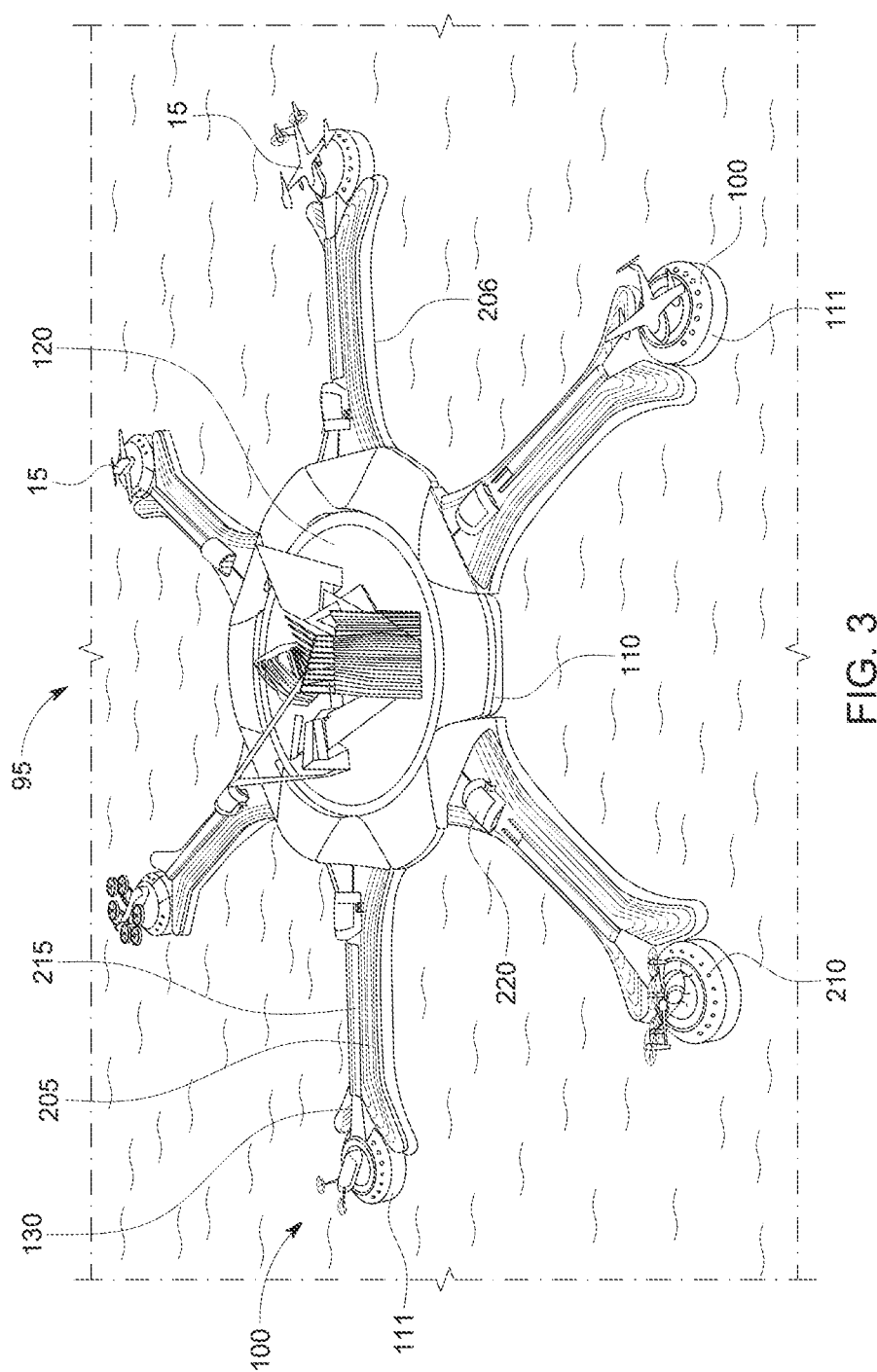
FIG. 3 depicts a perspective view of another landing system.

FIG. 3 depicts a complete landing system 95 with base 120 connected to, in this case, six spokes 205. Pod 100 attaches to dock 130 of spoke 205. In this view, six pods 100 dock to six spokes 205. In some versions, pods, attach to base 120 or spokes 205 by mooring with cleats (not shown). FIG. 47-52 show similar landing systems with glass domes 4000.

Figure 4:
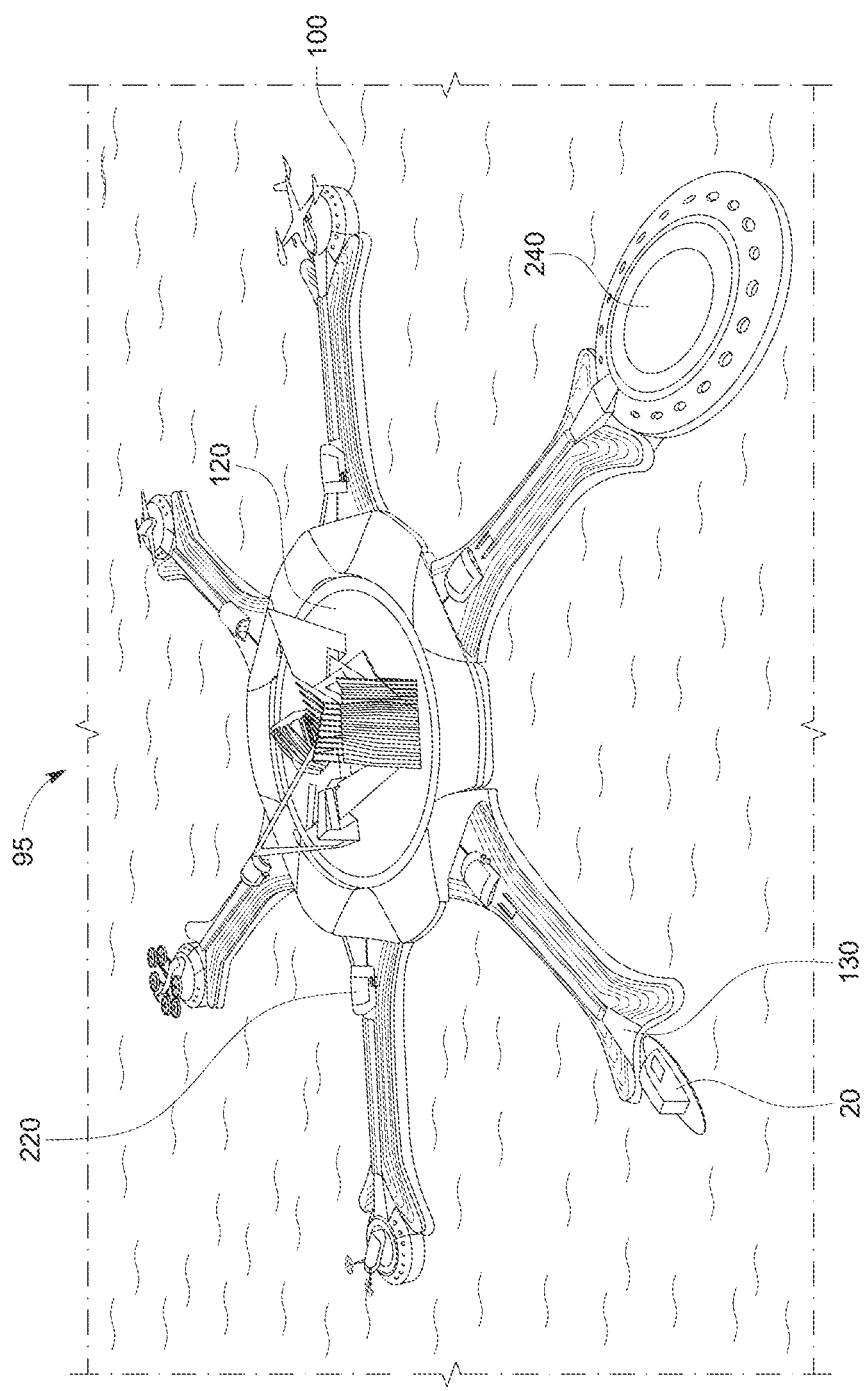
FIG. 4 depicts a perspective view of another landing system.

Pod 100 has a barge structure, pod hull 111, that allows pod 100 to float. Likewise, spokes 205 and base 120 have barge-like structures such as spoke hull 206 and base hull 110. Together, the components of landing system 95 float on a lake, river, harbor, or sea 7. FIG. 3 also shows terminal 220 located near base 120 on spoke 205. Spoke 205 has spoke pathway 215 to connect between base 120 and pod 100. FIG. 4 also shows various versions of air taxis 15. Some versions of pod 100 have a kitchen 330 that has a refrigerator and commercial oven to caterer the incoming and outgoing air taxi flights.

FIG. 4 shows an alternative version of landing systems 95. In this version, only four pods 100 are used. The other spokes are used to dock airship pod 240 and taxi boat 20.

As seen in FIG. 1, FIG. 2, FIG. 3, and FIG. 4, some versions of pod 100 will have six terminals 220 and circular walkaway 4210 in the center and can be lit up with LED lights 210 at night. Also, base 120 could have fewer or more than six terminals 220.

Figure 5:
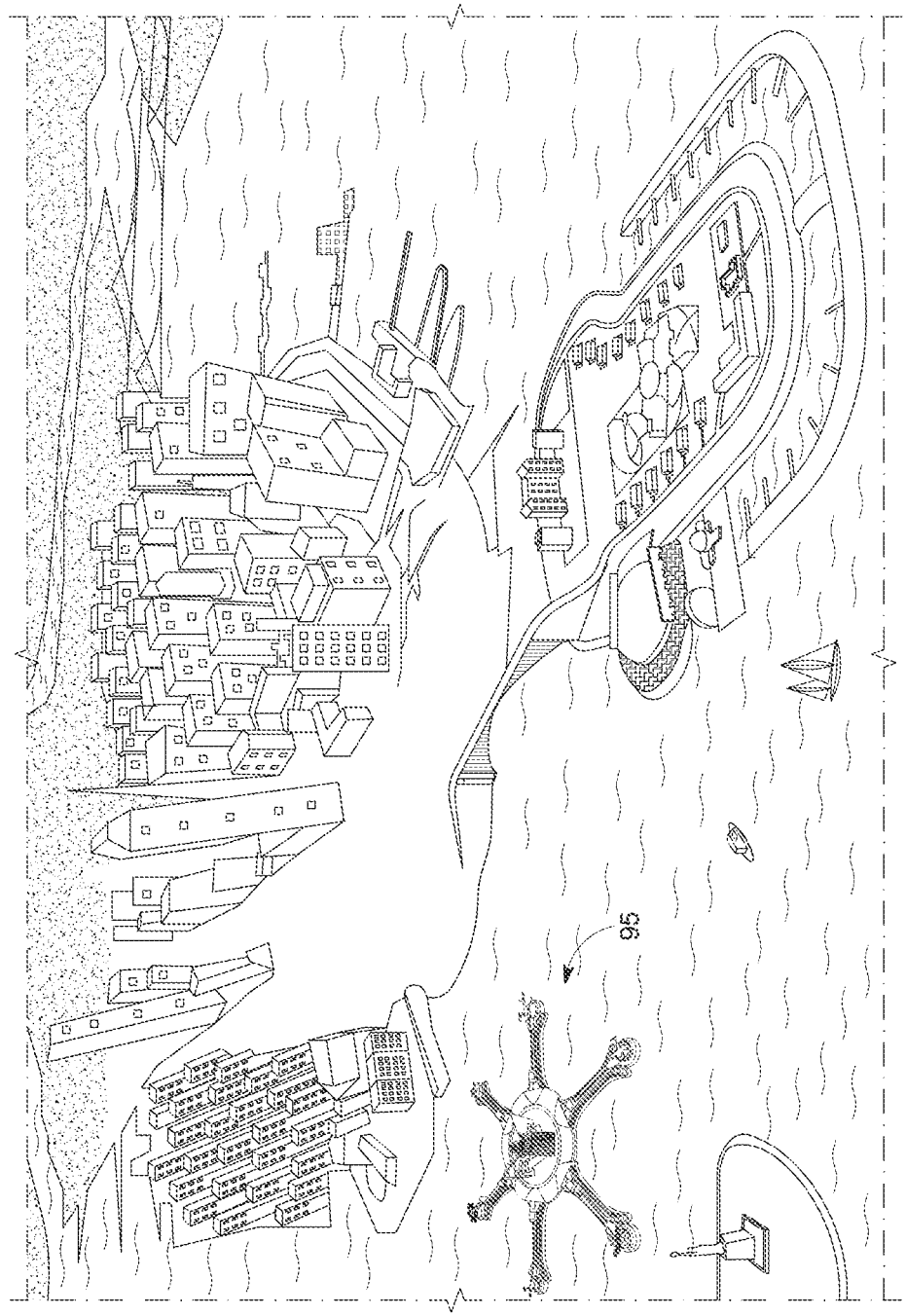
FIG. 5 depicts a perspective view of another landing system next to a related city.

FIG. 5 depicts Battery Park pod 100 during the day.

Figure 6:
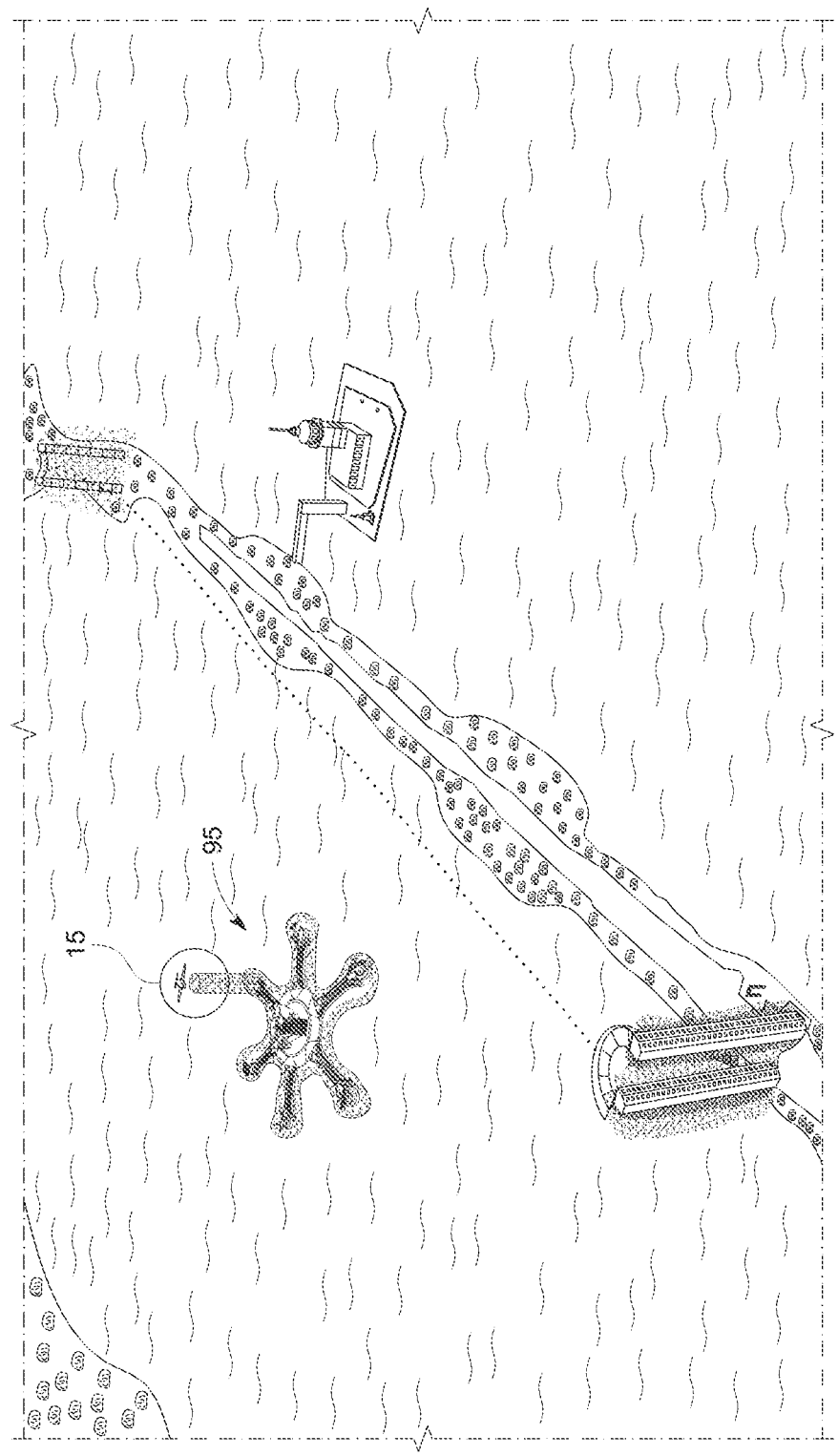
FIG. 6 depicts a perspective view of another landing system next to another related city.

FIG. 6 depicts Istanbul Park Bridge pod 100.

Figure 7:
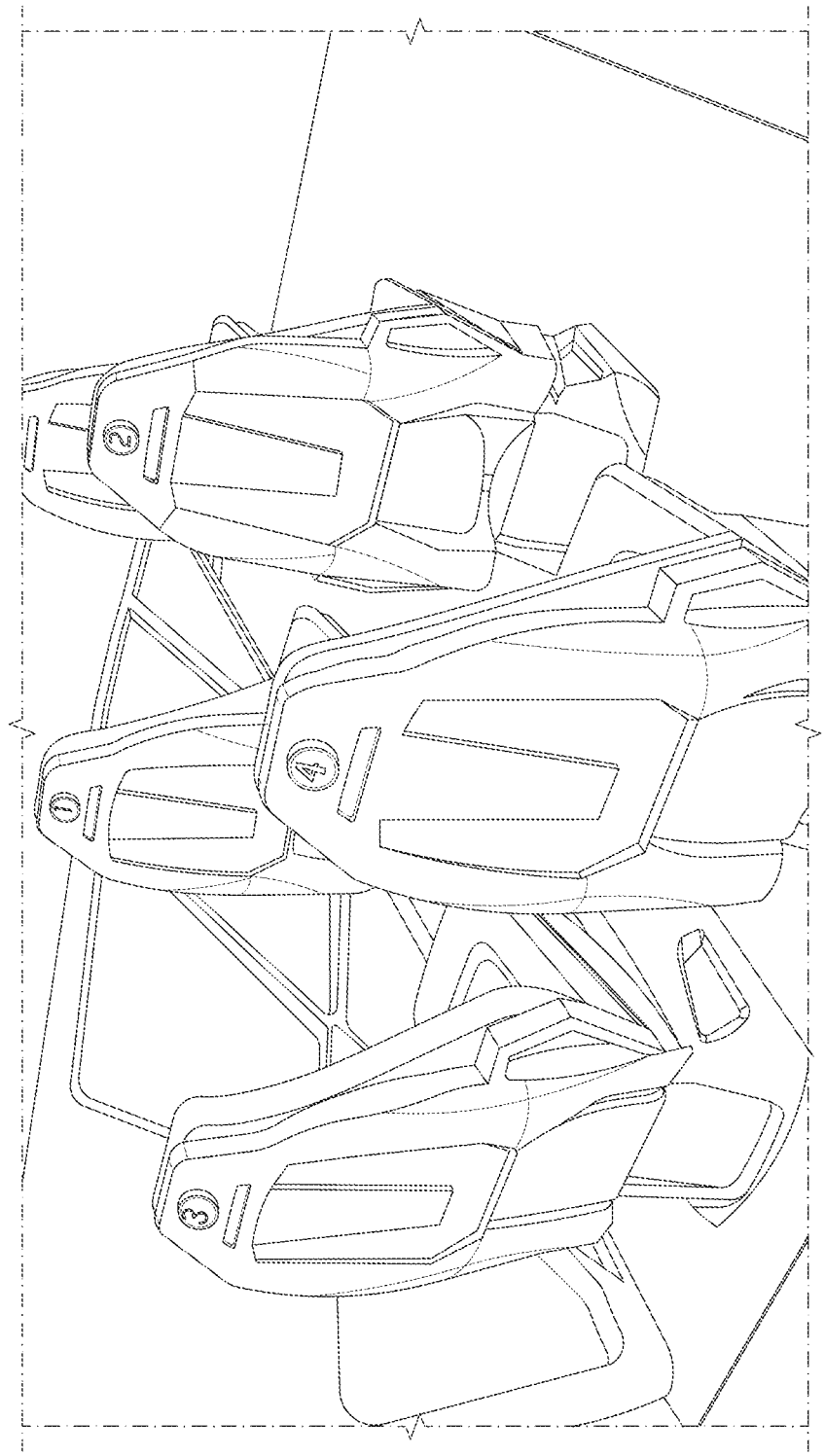
FIG. 7 depicts a perspective view of the interior of an air taxi.

FIG. 7 depicts a close-up of air taxi 15 interior.

FIG. 7 shows the seats that the traveler will be able to select from the air taxi app. A red light on the seat could show the seat is booked, and green shows it's available. In the air taxi app, the traveler will have the option to insert the country of destination, and when typing in the destination within the country, the app can present the closest pod 100 to the commuter's destination.

Figure 8:
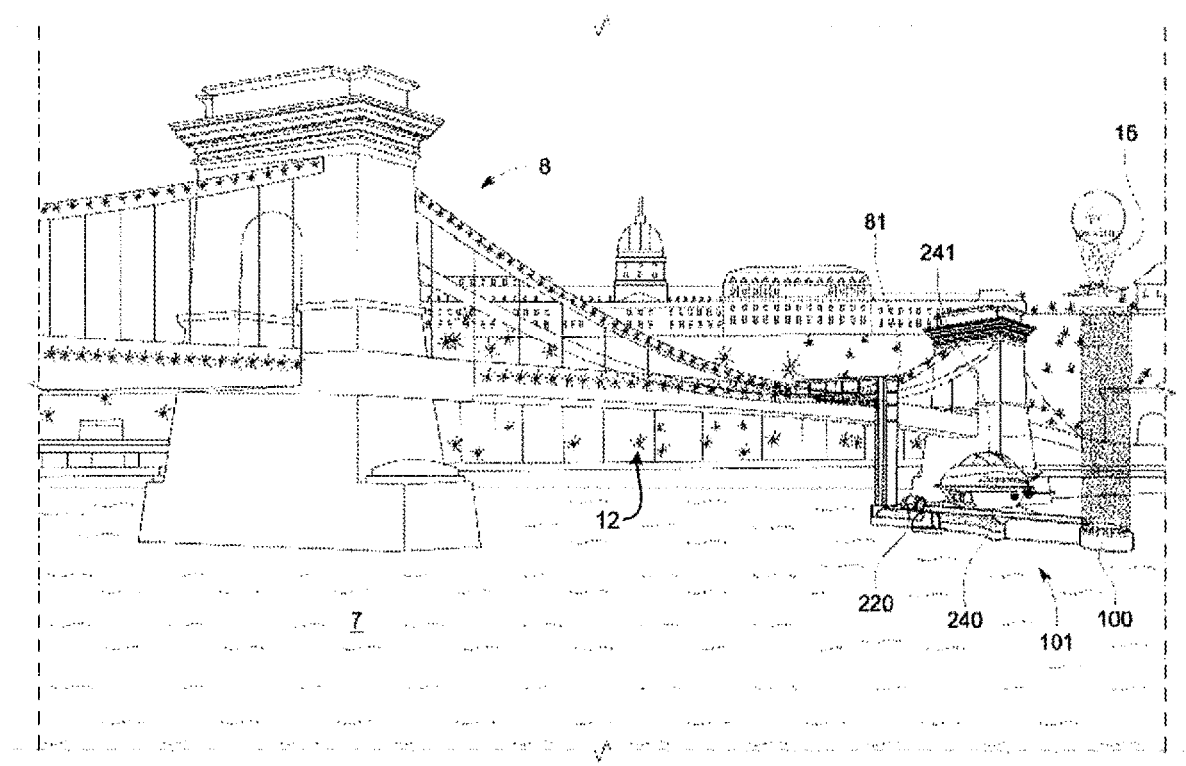
FIG. 8 depicts a perspective view of a small landing system connected to a bridge.

FIG. 8 depicts some versions of pod 100 connected to city bridge 8. The figure shows elevator 81 with the external side lit up in bridge lights 12. Furthermore, these smaller air pods 101 hold one or two pods 100 for air taxi 15 and airship pod 240 dedicated to airship 241. Smaller air pods 101 would be an ideal application for narrower rivers 7, such as the Seine River in Paris, which has a width of approximately 656 feet. This figure also shows air taxi 15 with a 3*d* hologram ad 4010 projecting from the vehicle. The hologram ad 4010 projects on a fan (not shown) mounted on a stick or pole (not shown) extending from the vehicle. Usually, the fan deploys as the vehicle lands.

FIG. 8 shows pod 100 located in Budapest.

Figure 9:
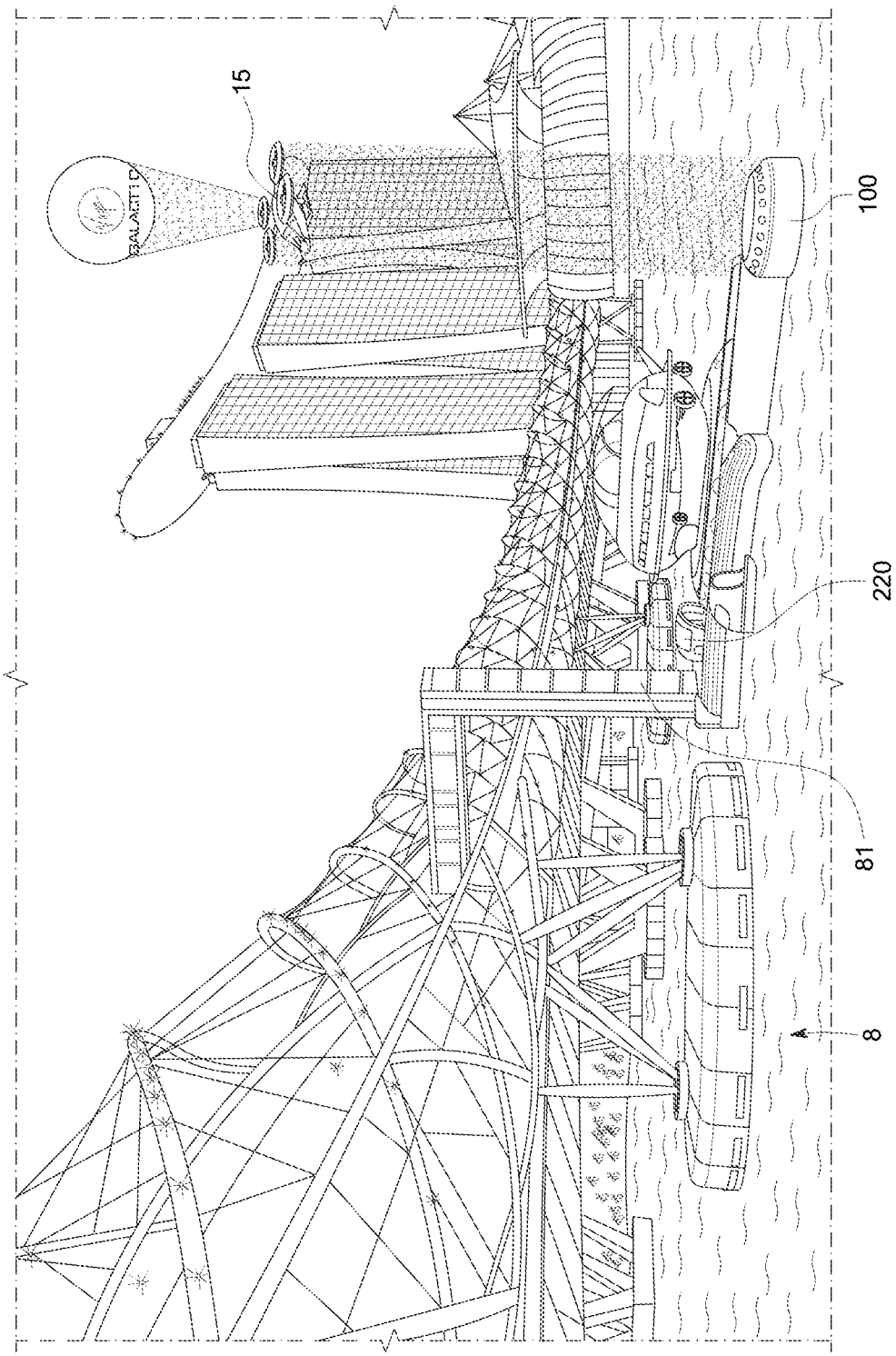
FIG. 9 depicts a perspective view of a small landing system connected to another bridge.

FIG. 9 shows pod 100 located in Singapore.

Figure 10:
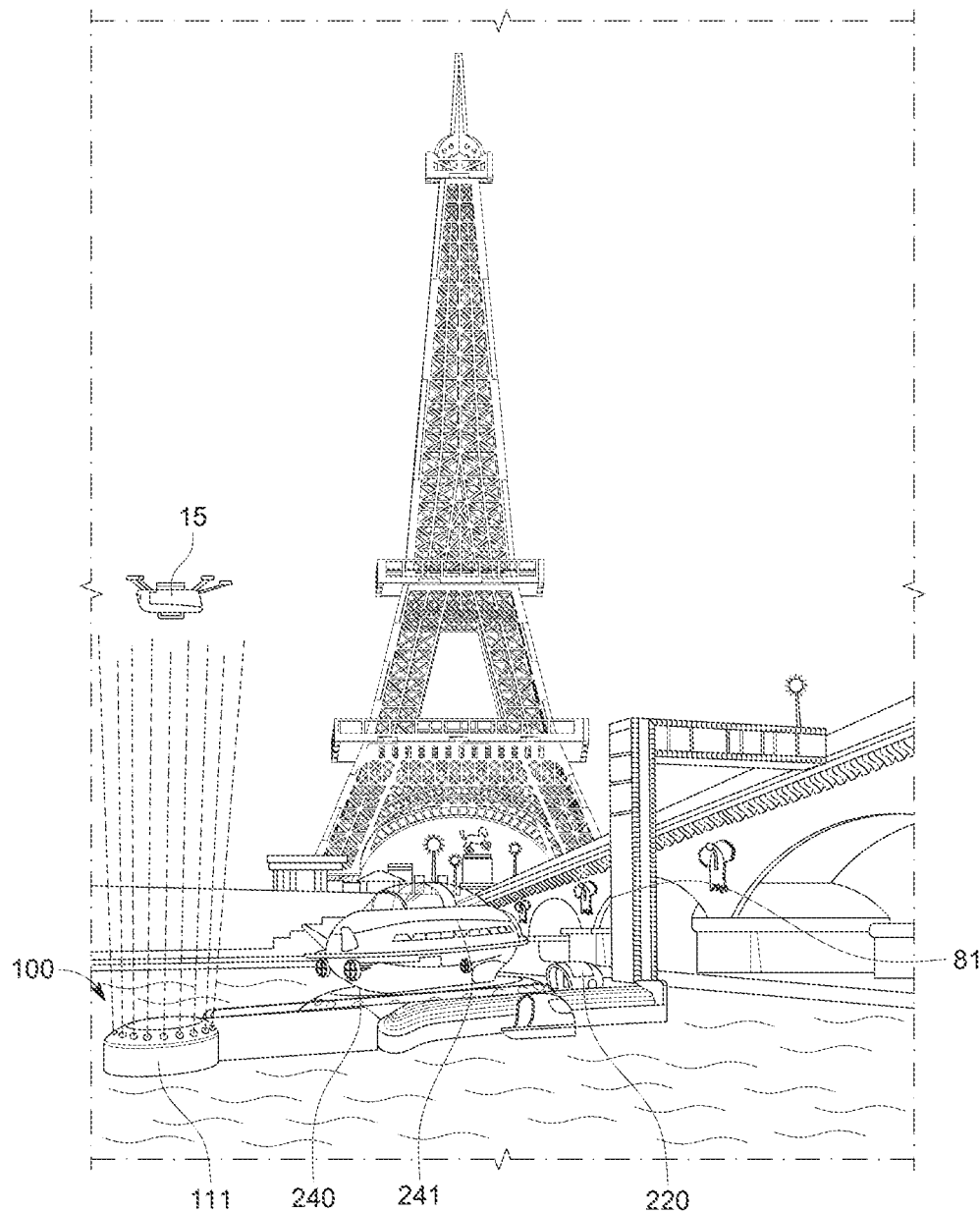
FIG. 10 depicts a perspective view of a small landing system connected to another bridge.

FIG. 10 shows pod 100 located in Paris.

Figure 11:
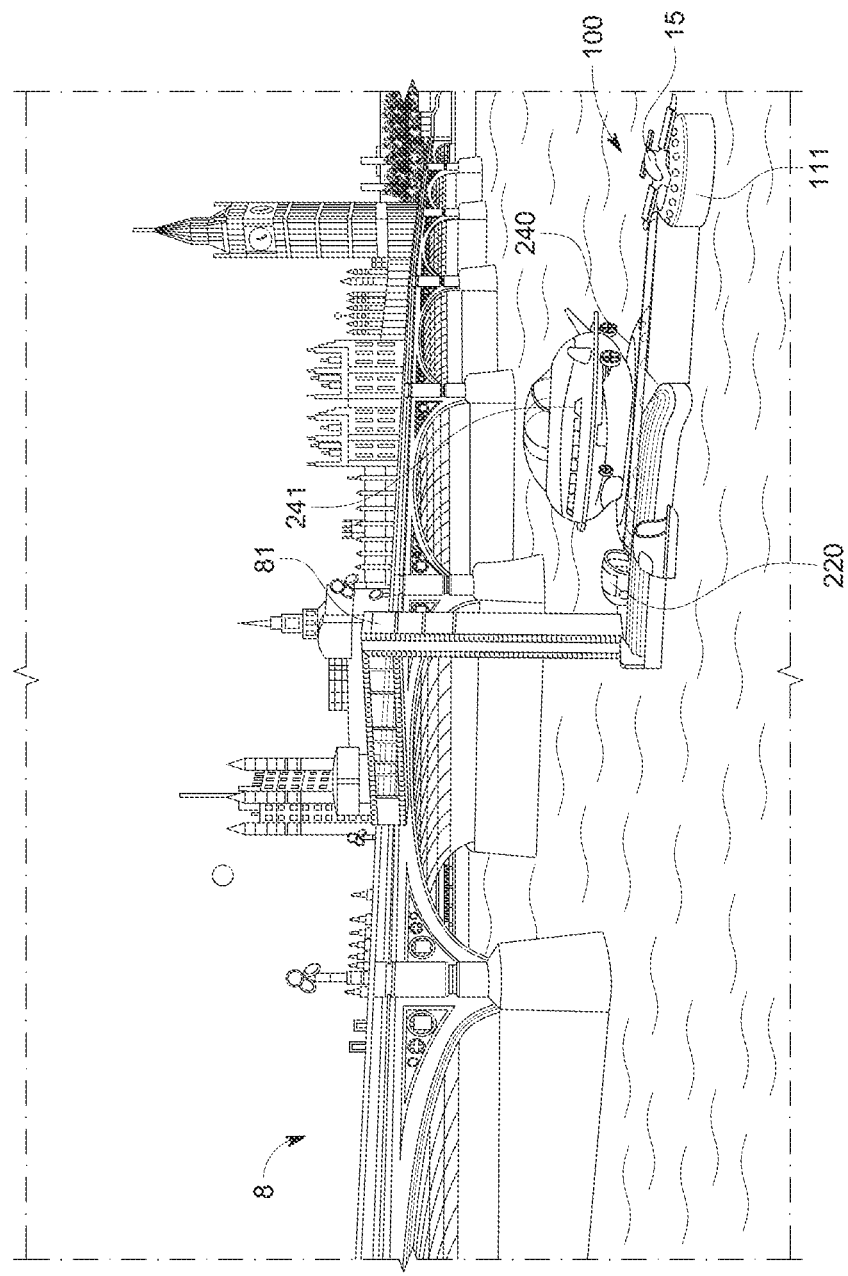
FIG. 11 depicts a perspective view of the small landing system connected to another bridge.
Figure 12:
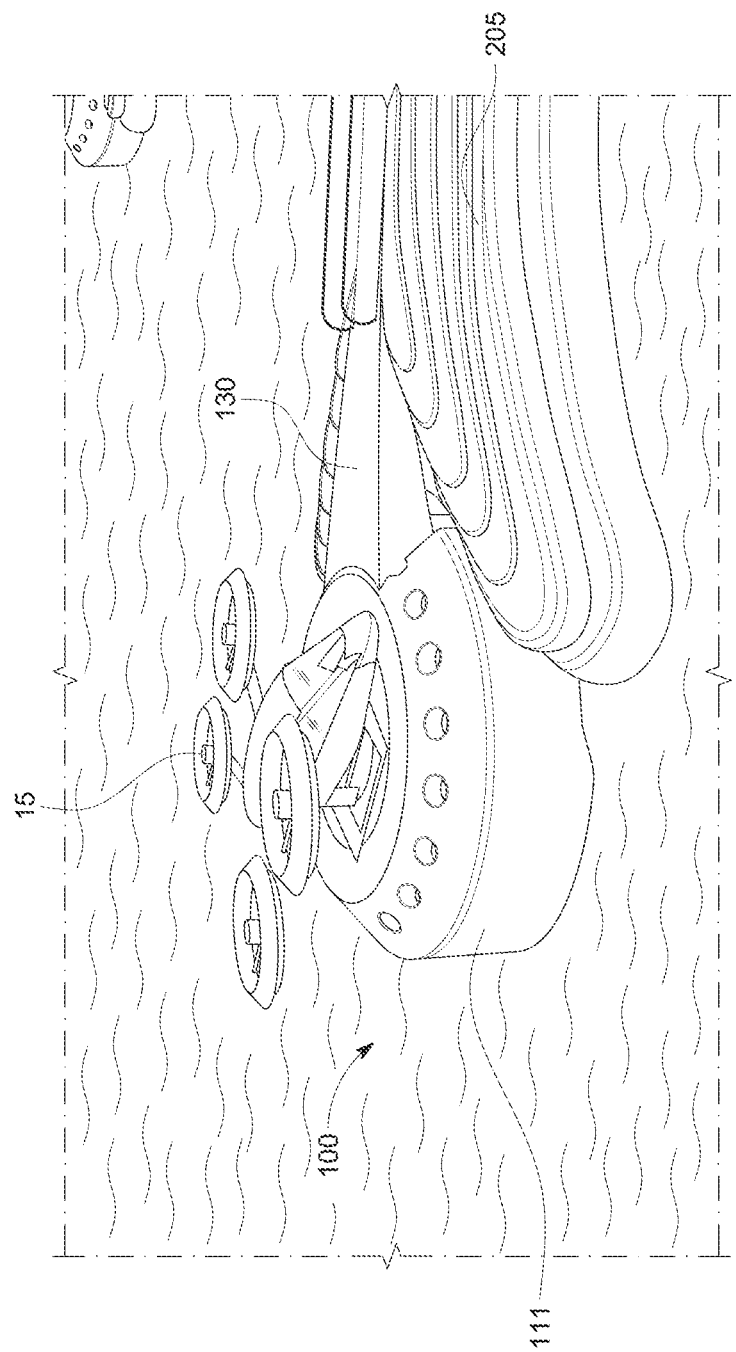
FIG. 12 depicts a perspective view of components of a landing system.

FIG. 11 shows pod 100 located in London.

Figure 13:
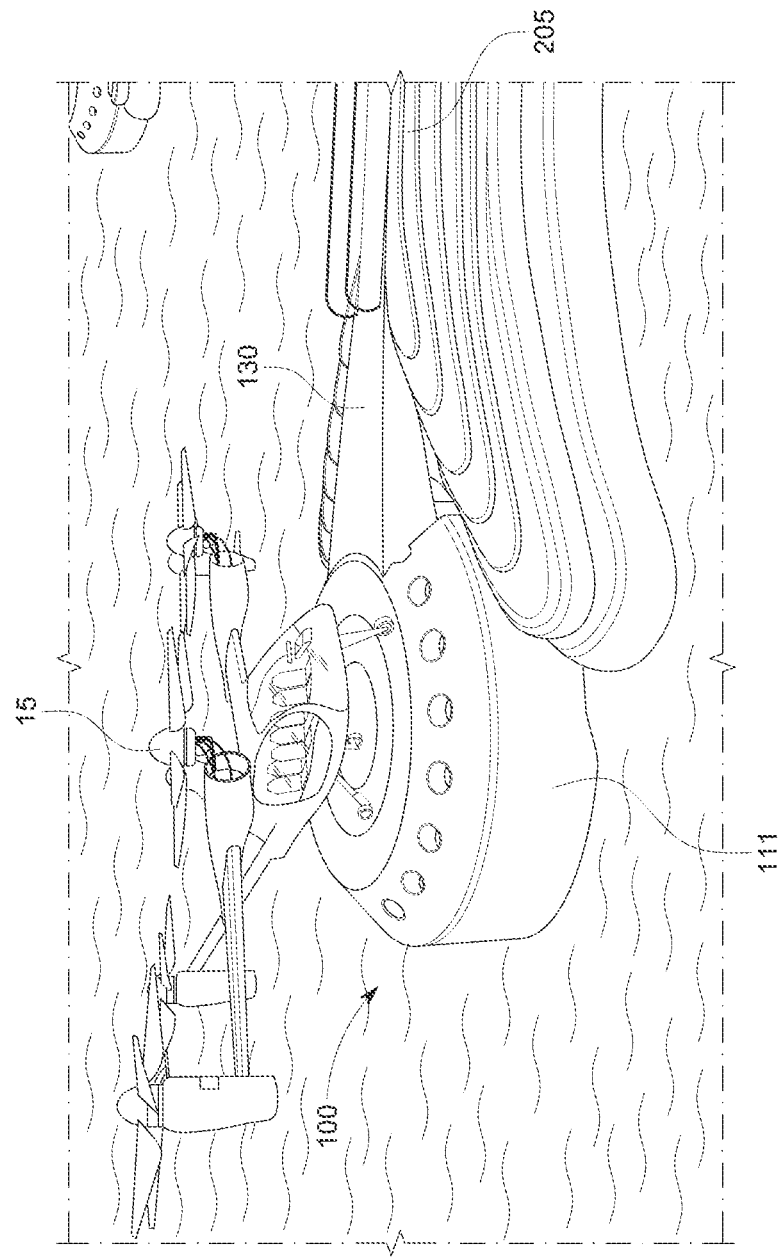
FIG. 13 depicts the components of FIG. 12 with an alternative air taxi model.
Figure 14:
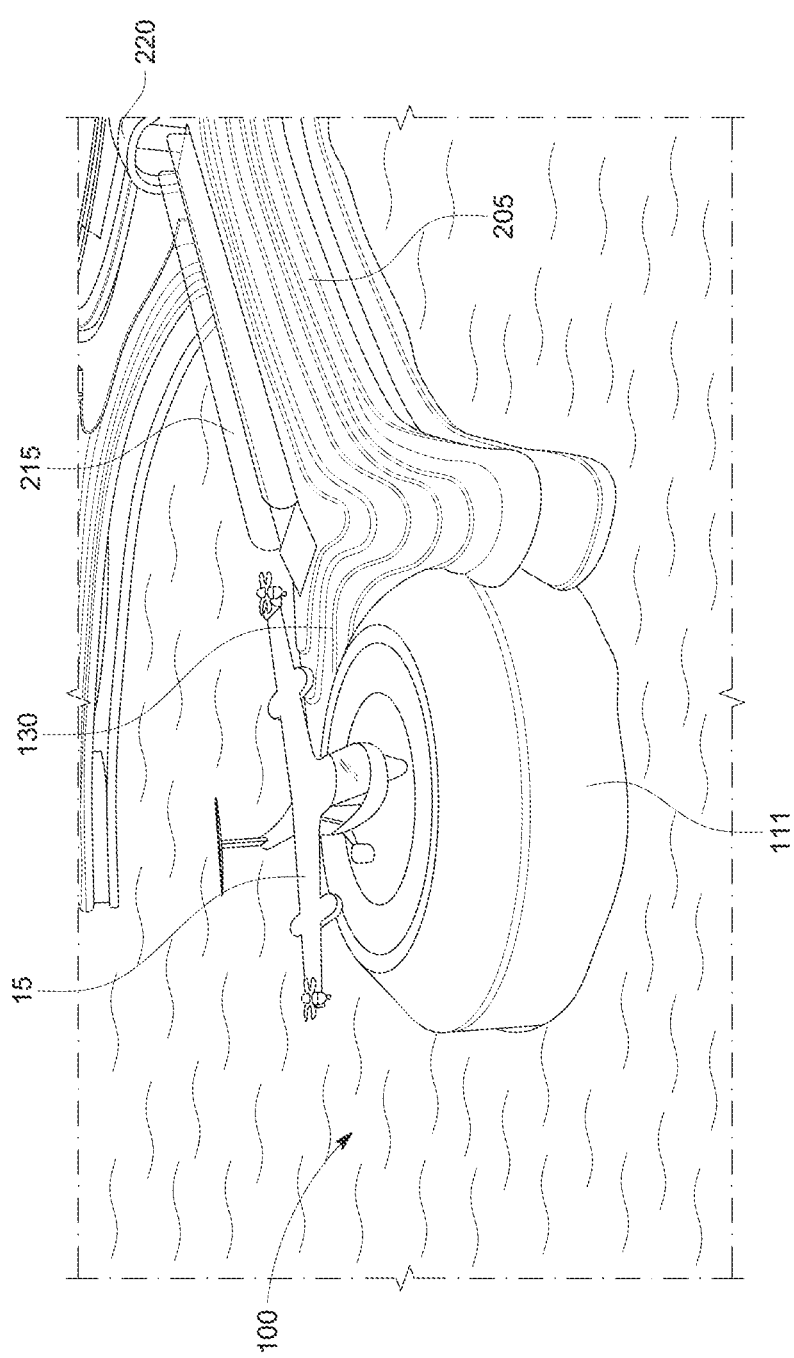
FIG. 14 depicts components of a landing system.
Figure 15:
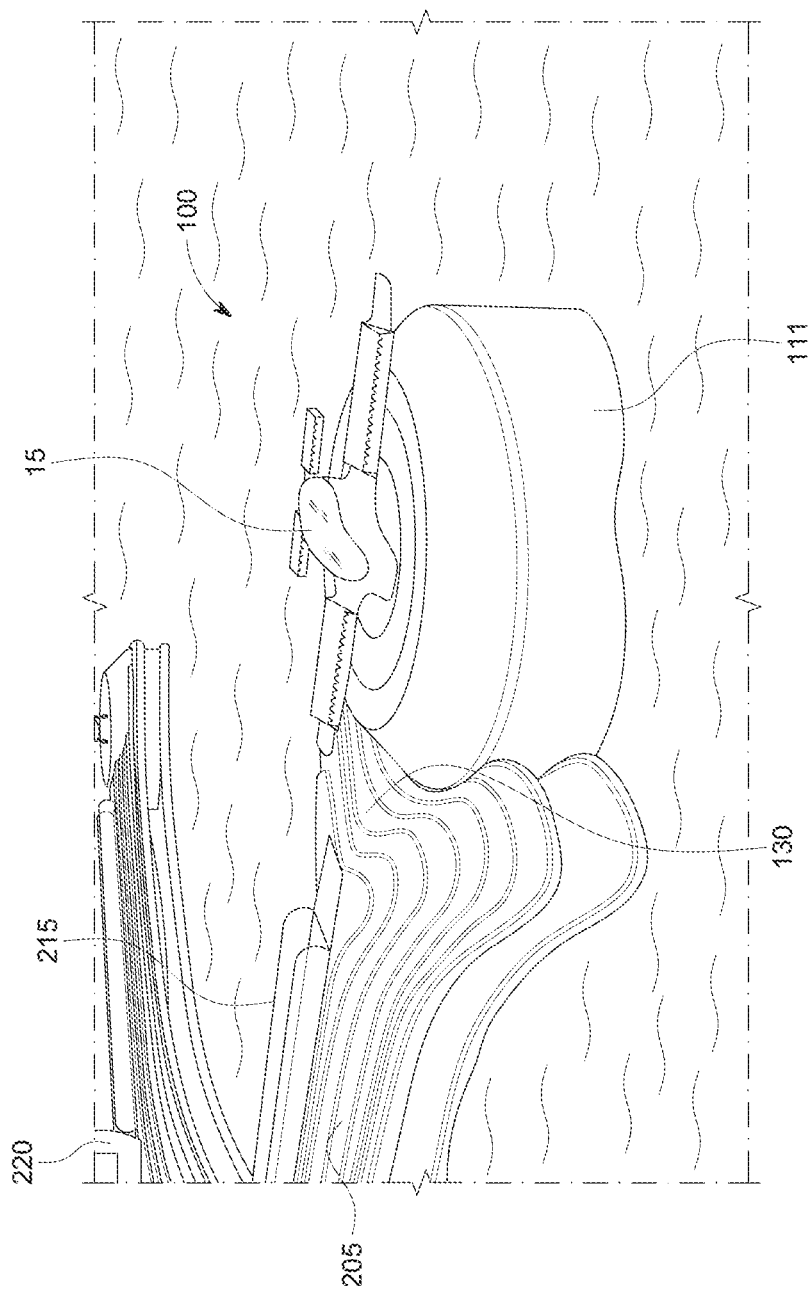
FIG. 15 depicts components of a landing system.
Figure 16:
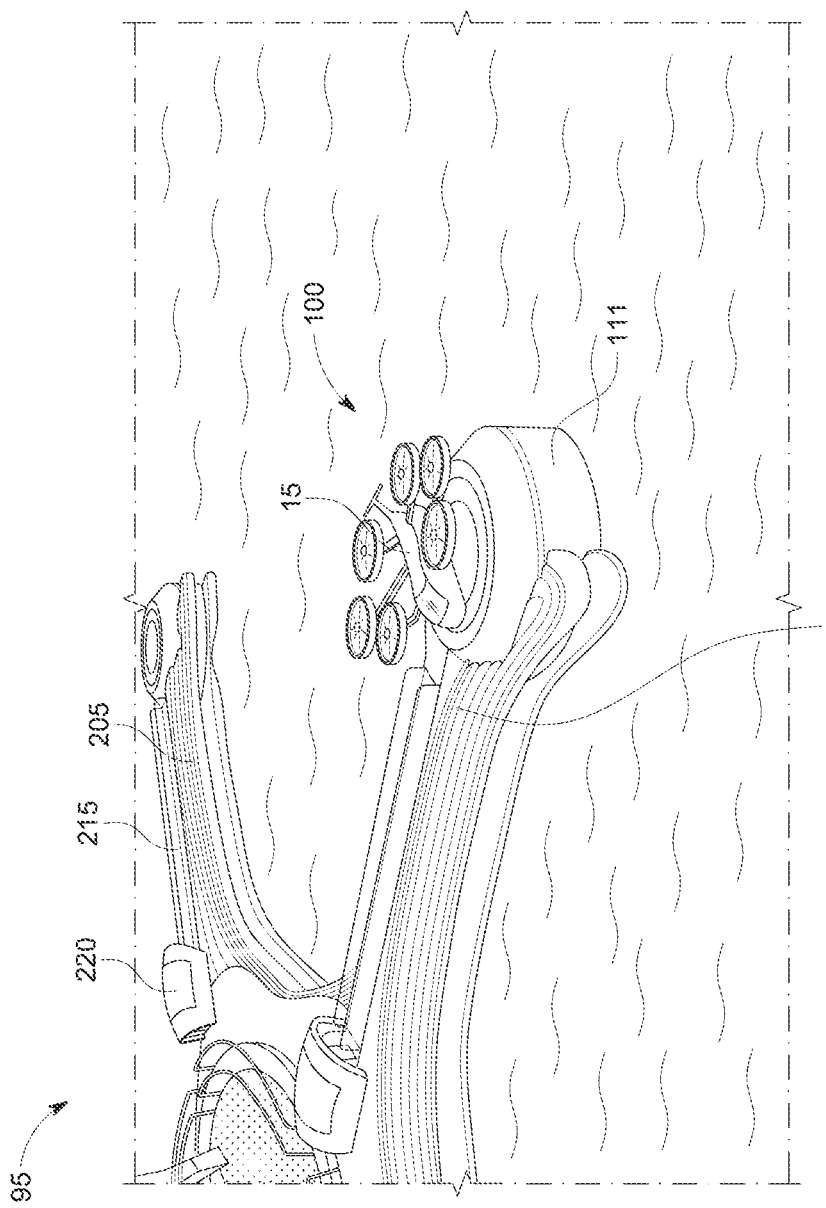
FIG. 16 depicts components of a landing system.
Figure 17:
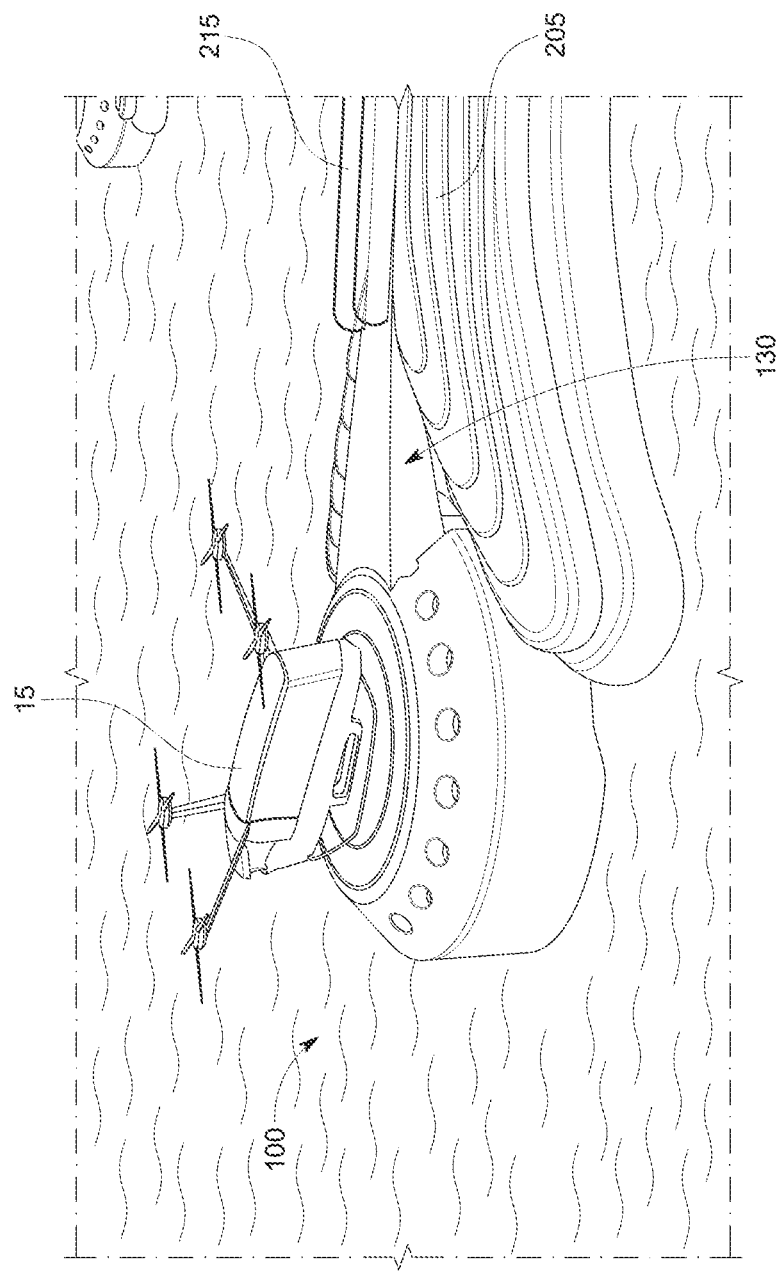
FIG. 17 depicts components of a landing system.
Figure 18:
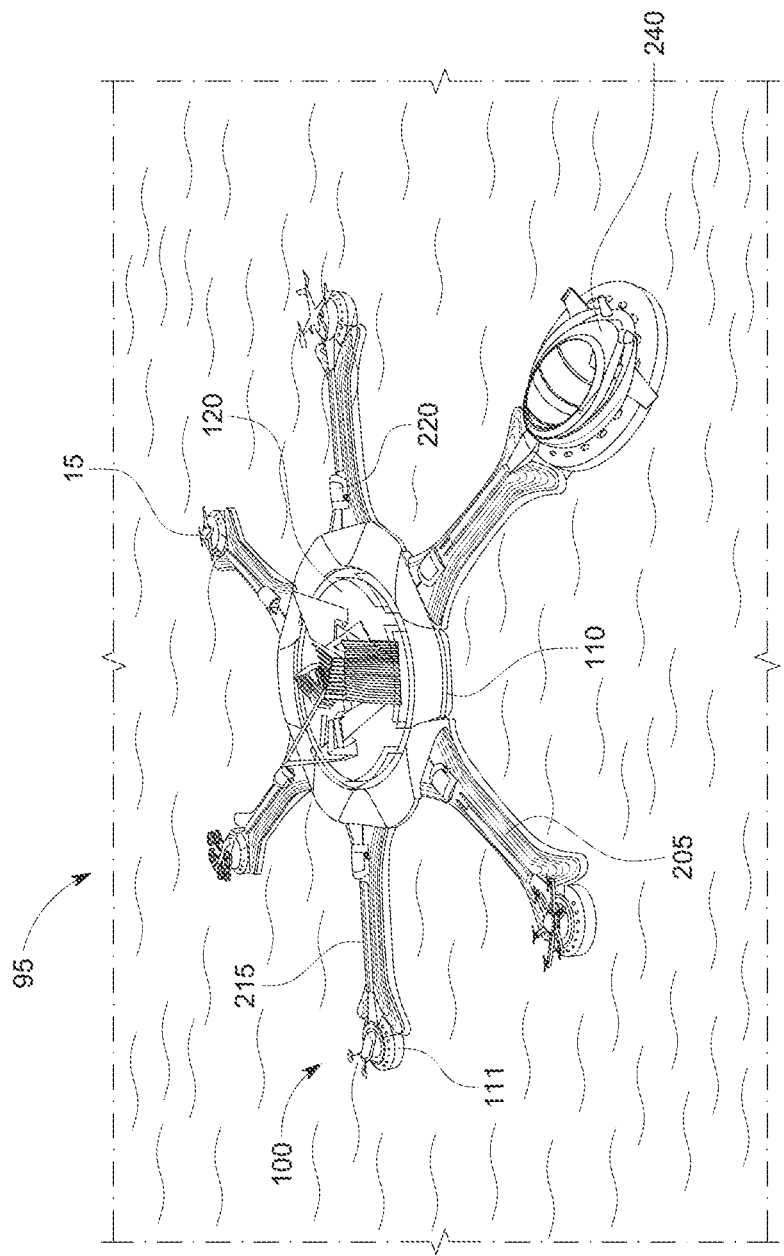
FIG. 18 depicts a perspective view of another landing system.

FIG. 13, FIG. 11, and FIG. 18 show airship 241 sitting on a designated spot on landing system 95. Of course, since airship 241 is larger than air taxi 15, airship pod 240 is larger than pod 100.

FIG. 12-FIG. 17 show air pods 100 with different variations of air taxi 15.

By booking the flight, the traveler will be able to bypass security since the commuter will already have gone through security at pod terminal 220, which will ideally be located along the coast across from pod 100. Furthermore, at terminal 220, the passenger can show their passport, even a digital one, if this is allowed in the future.

Figure 19:
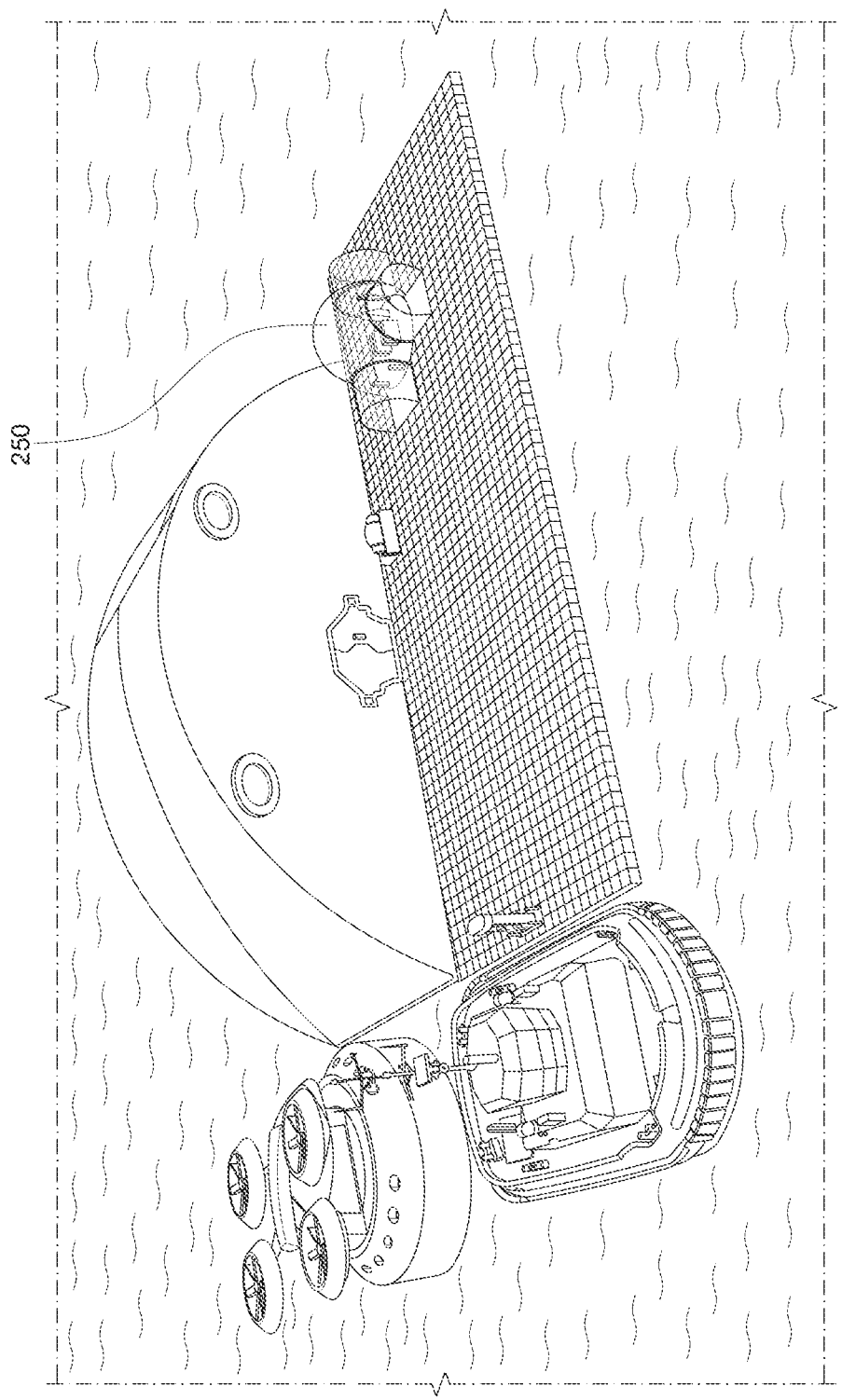
FIG. 19 depicts a perspective view of components of a landing system.

FIG. 19 depicts a close-up version of terminal 220 that connects to pod 100 that has been assembled for water transport into a large barge pulled by a tugboat. It shows fuel pump 30 or recharging station 30.

Figure 22:
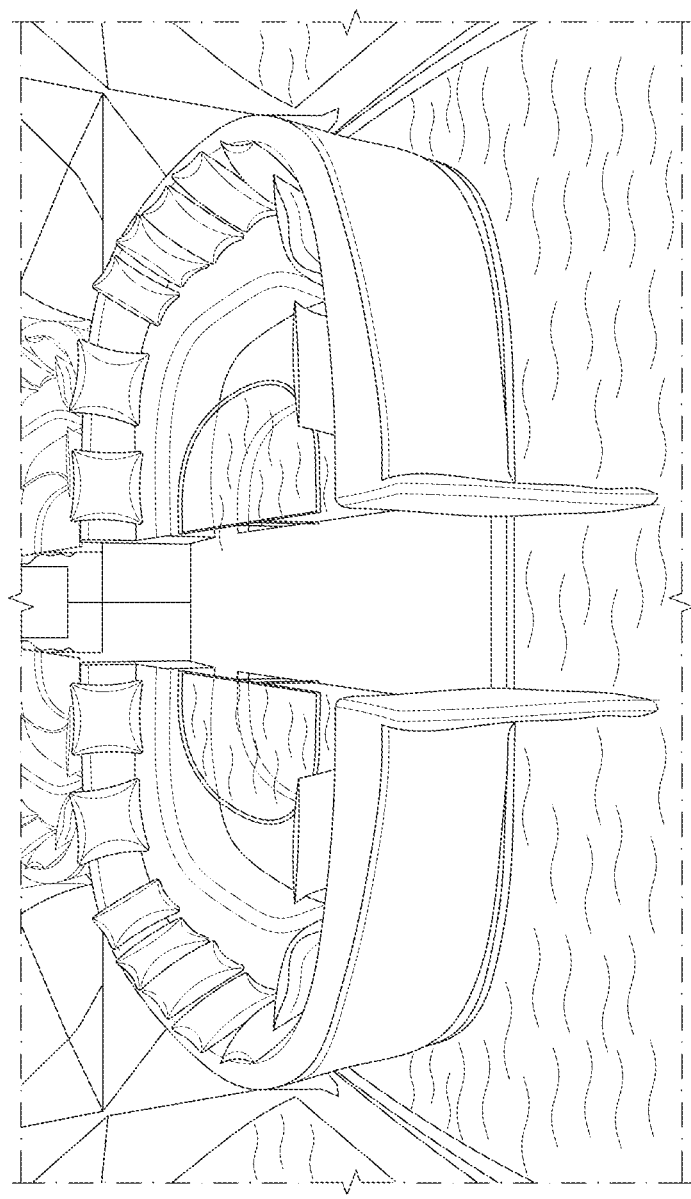
FIG. 22 depicts the interior of an air ship.

FIG. 22 shows airship 241 transforming into a club. Using the air taxi app, the traveler, for instance, will have an option to book a daytime city tour or night tour, which would mean could be equipped with a dance floor, bar, and stage for a DJ to set up so it can become a night club in the sky.

Figure 20:
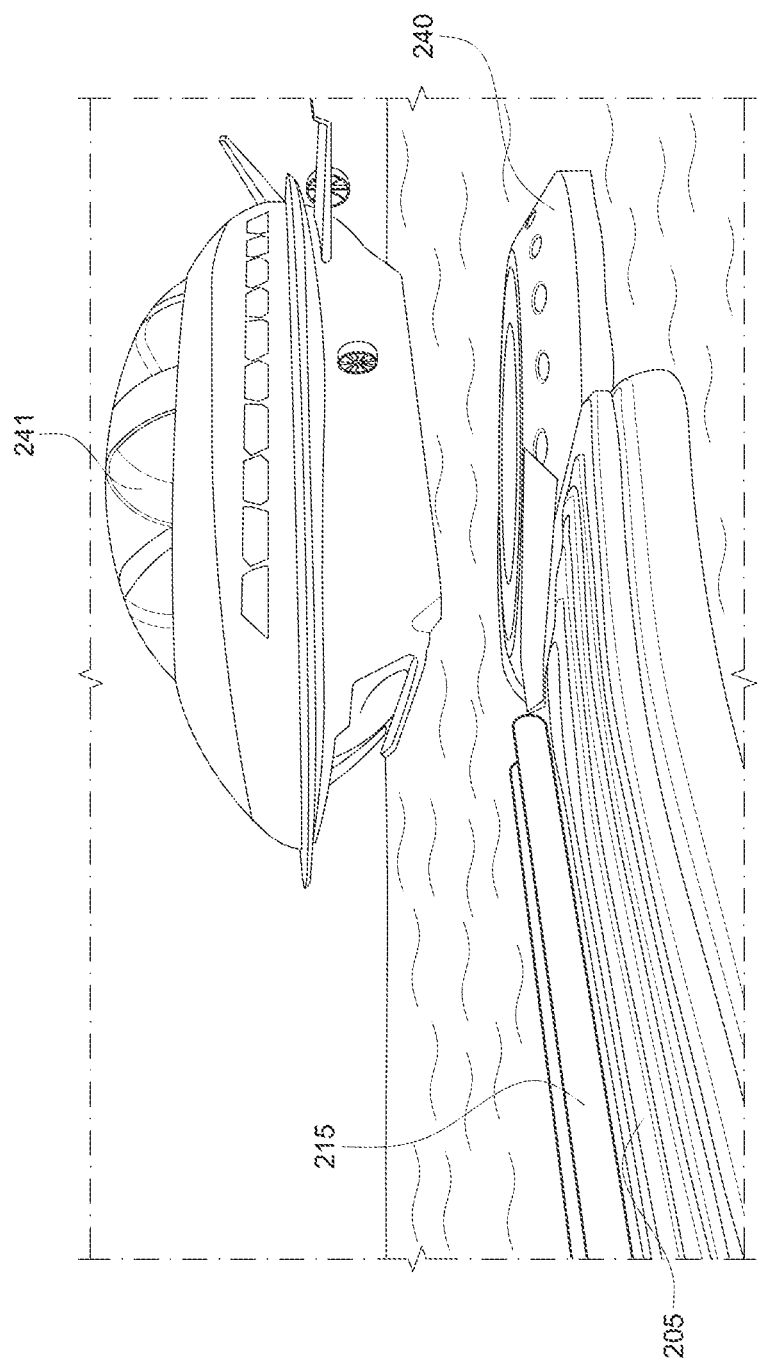
FIG. 20 depicts a perspective view of components of the landing system, including an airship pod.
Figure 21:
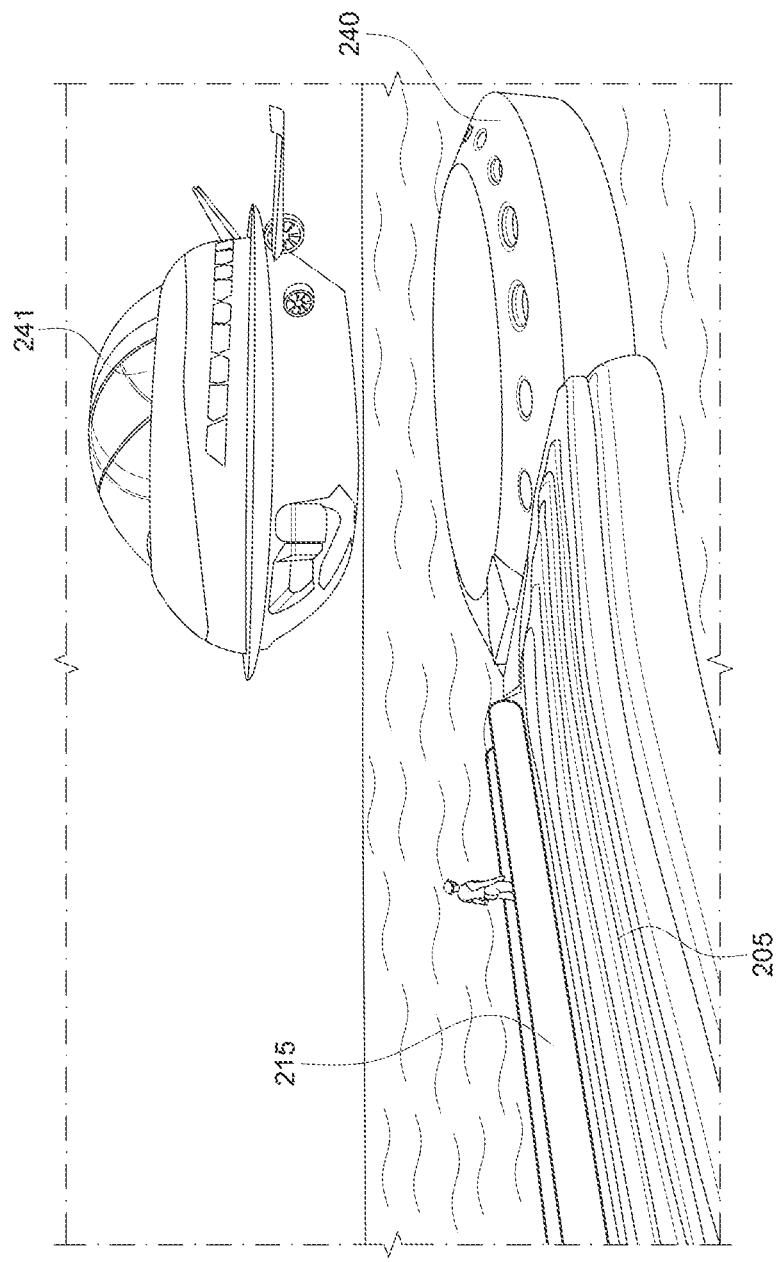
FIG. 21 depicts another perspective view of the view of FIG. 20.

FIG. 20-FIG. 22 depicts various versions of airships that will use airship pod 240.

In some versions, membership via the app will reduce the price of booking air taxi 15.

FIG. 19 show versions of pod 100 equipped with a smart sanitizer machine that will take your temperature and disinfect your personal belongings with UV lighting and have a sanitization liquid for your hands. This machine can be placed by the entrance of terminal 220. Some versions of the smart sanitizer machine will be covered with a plastic bubble to protect them from inclement weather.

If a travelers' temperature is above normal, the traveler will be sent back home from side bubble exit 250.

The traveler can have luggage scanned outside of terminal 220. Entry technology such as facial recognition, scan from a chip or iWatch, or smartphone can identify the traveler.

In some versions, taxi boat 20 transporting passengers to and from terminal 220 will be stationed by terminal 220, which could be a barge structure.

The taxi boats 20 traveling to and from terminal 220 can be equipped with a prior art hologram fan projecting an advertisement above it.

Some versions of pod 100 will have AI robots greeting passengers when getting off the boat at pod 100, which can provide customer service.

Pod 100 owners will generate income by renting out each terminal 220 to air taxi carriers.

The traveler on the air taxi app can also book a restroom. In some versions, it could be either individual bathroom 300 or stall 310 at pod 100 or base 120. This way, the commuter will save time if meeting someone for dinner. Showers 320 are also cleaned in between each use.

The traveler on the air taxi app can also book a shower 320 at pod 100 or base 120. This way, the commuter will save time if meeting someone for dinner, as shown in my video. The showers 320 are also cleaned in between each use.

Figure 23:
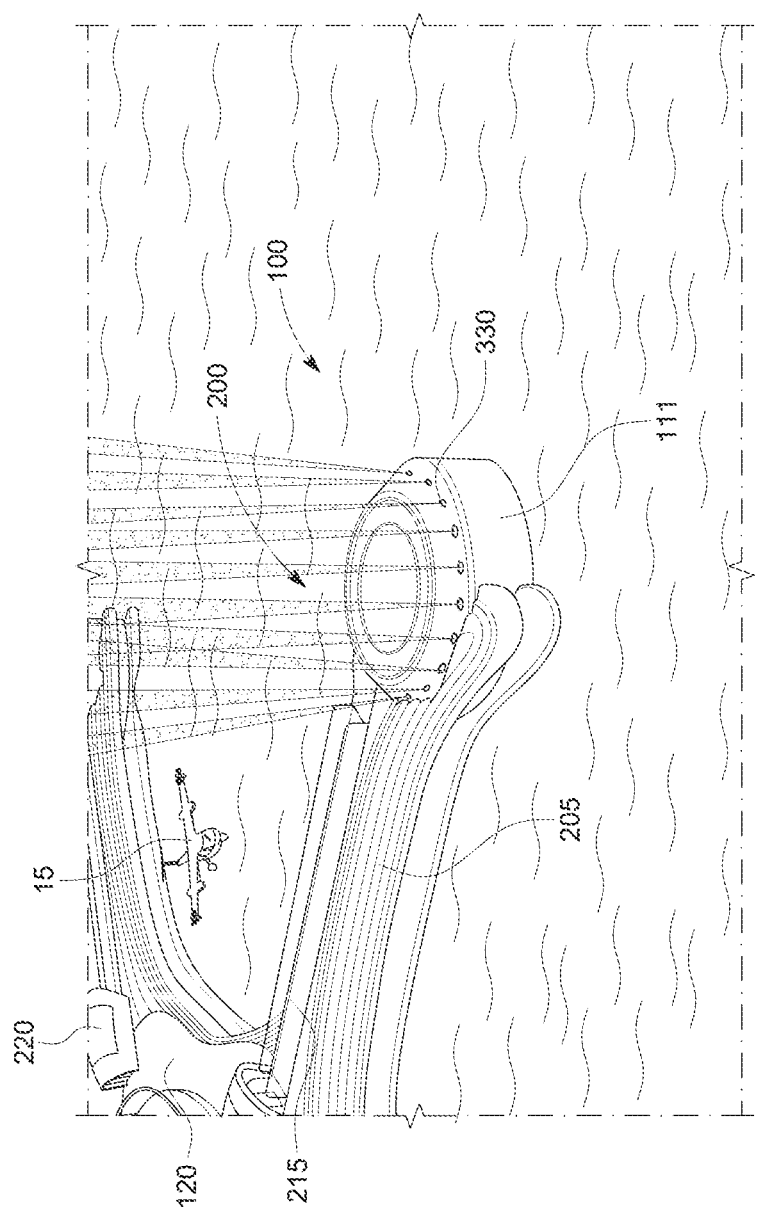
FIG. 23 depicts components of a landing system.

FIG. 23 shows a version of system 95 in which pod 100 has lights 210 shooting up vertically to assist the pilot with landing in the event of low visibility.

Pod 100 can be equipped with underwater wind tunnel technology that can be used to generate power from flowing water and water currents.

In the event an air taxi needs repair, it can be towed to terminal 220. In comparison, removing a broken-down air taxi from a building roof would be much more expensive.

Figure 24:
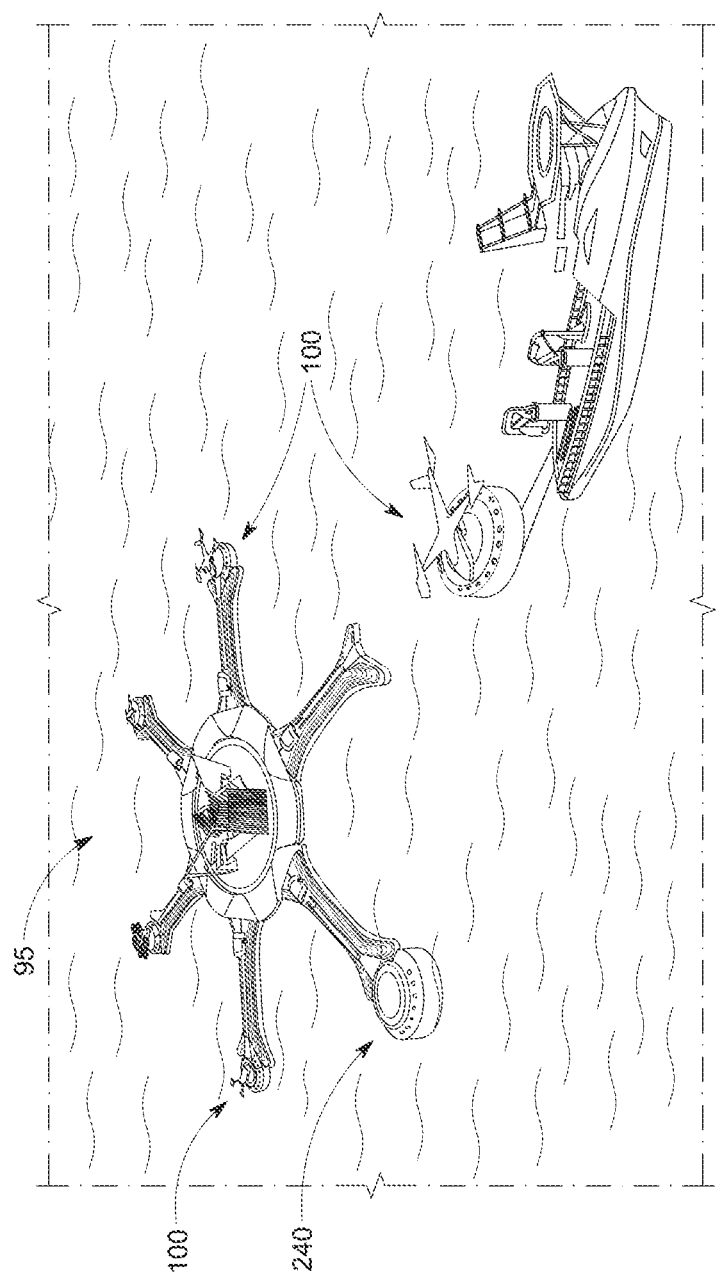
FIG. 24 depicts components of a landing system in tow.

FIG. 24 shows an air taxi being towed by boat 51.

Figure 25:
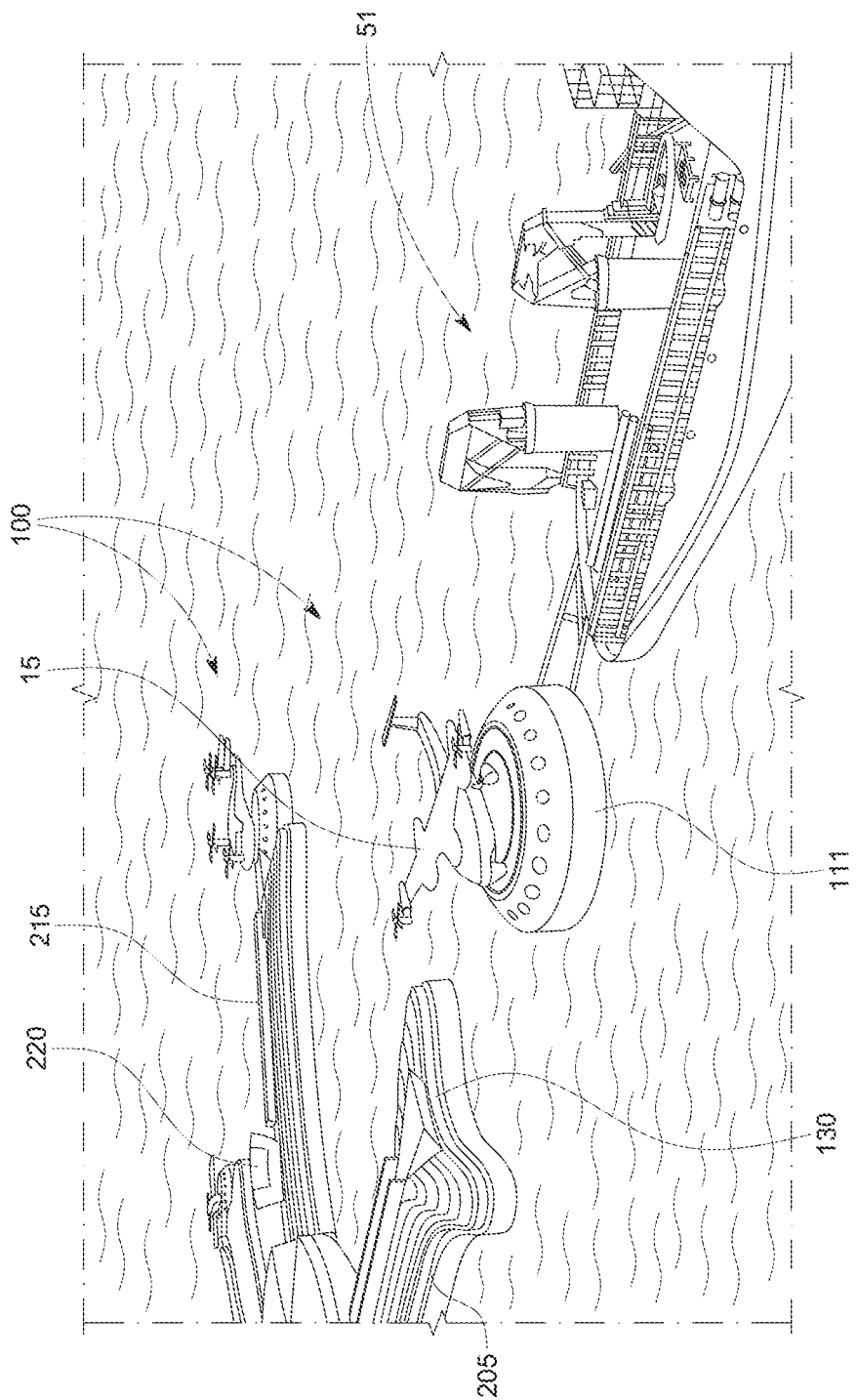
FIG. 25 depicts components of another landing system in tow.

FIG. 25 shows another air taxi being towed by boat 51.

Figure 26:
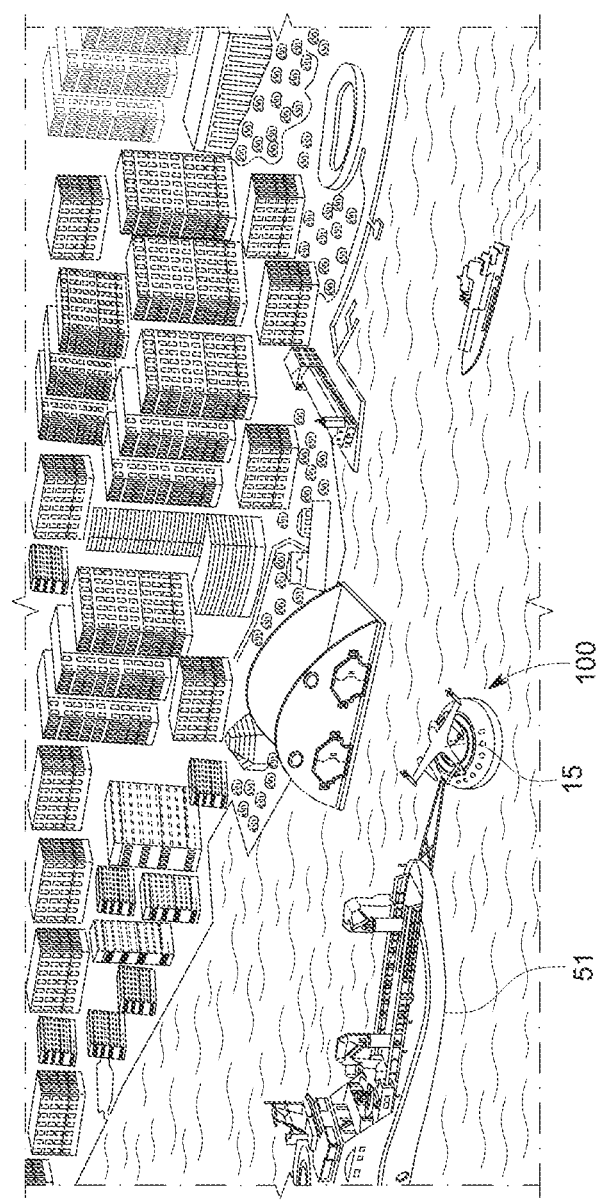
FIG. 26 depicts components of another landing system in tow.

FIG. 26 shows yet another air taxi being towed by boat 51.

Figure 27:
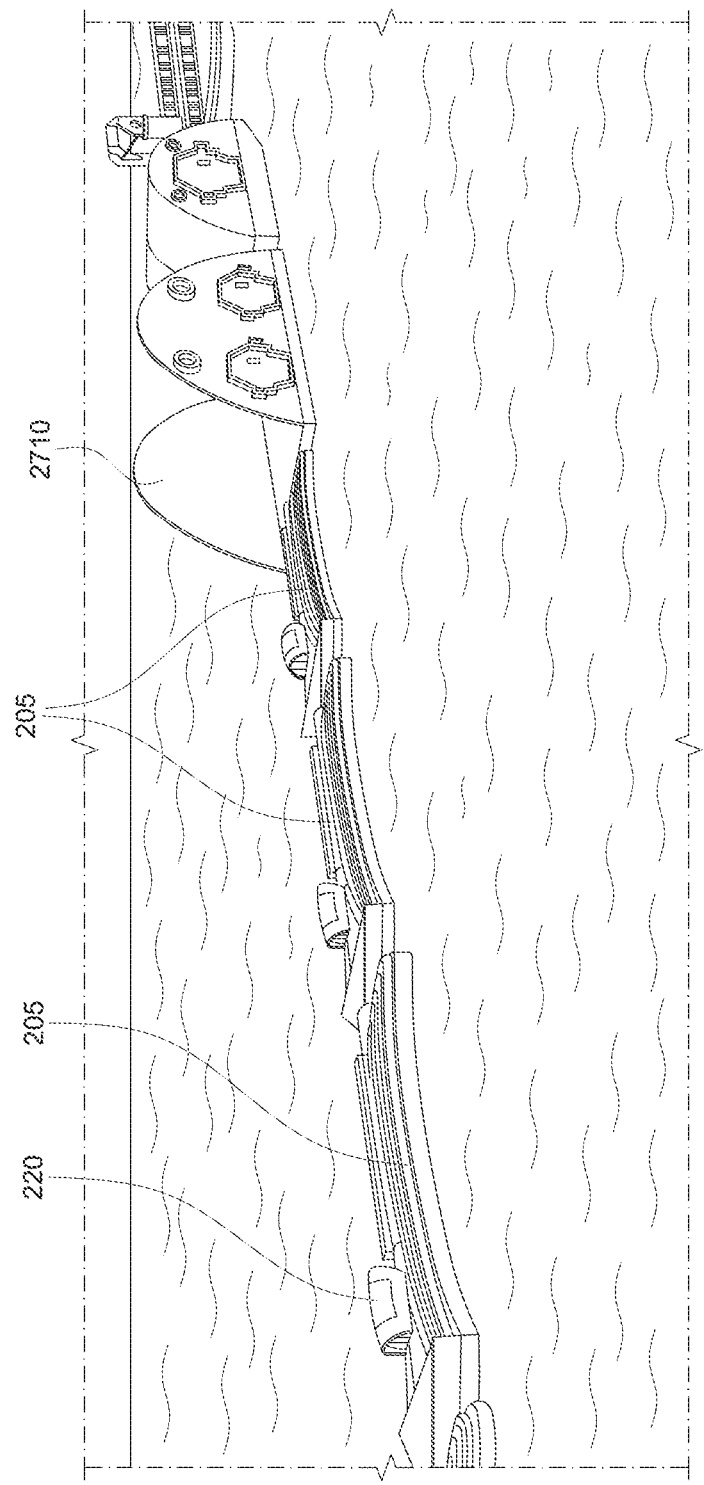
FIG. 27 depicts components of a landing system, hitched in line for towing.
Figure 28:
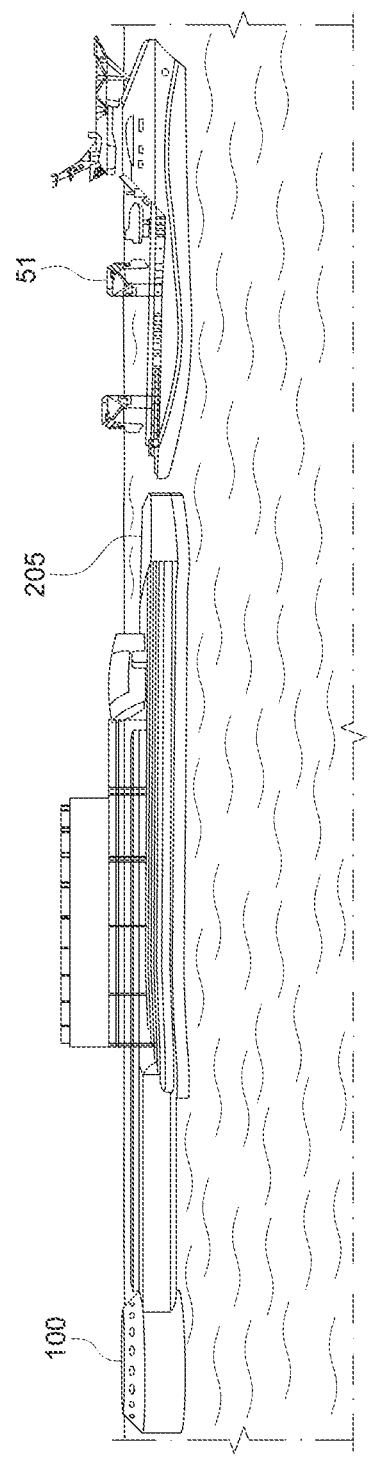
FIG. 28 depicts components of another landing system, hitched in line for towing.
Figure 30:
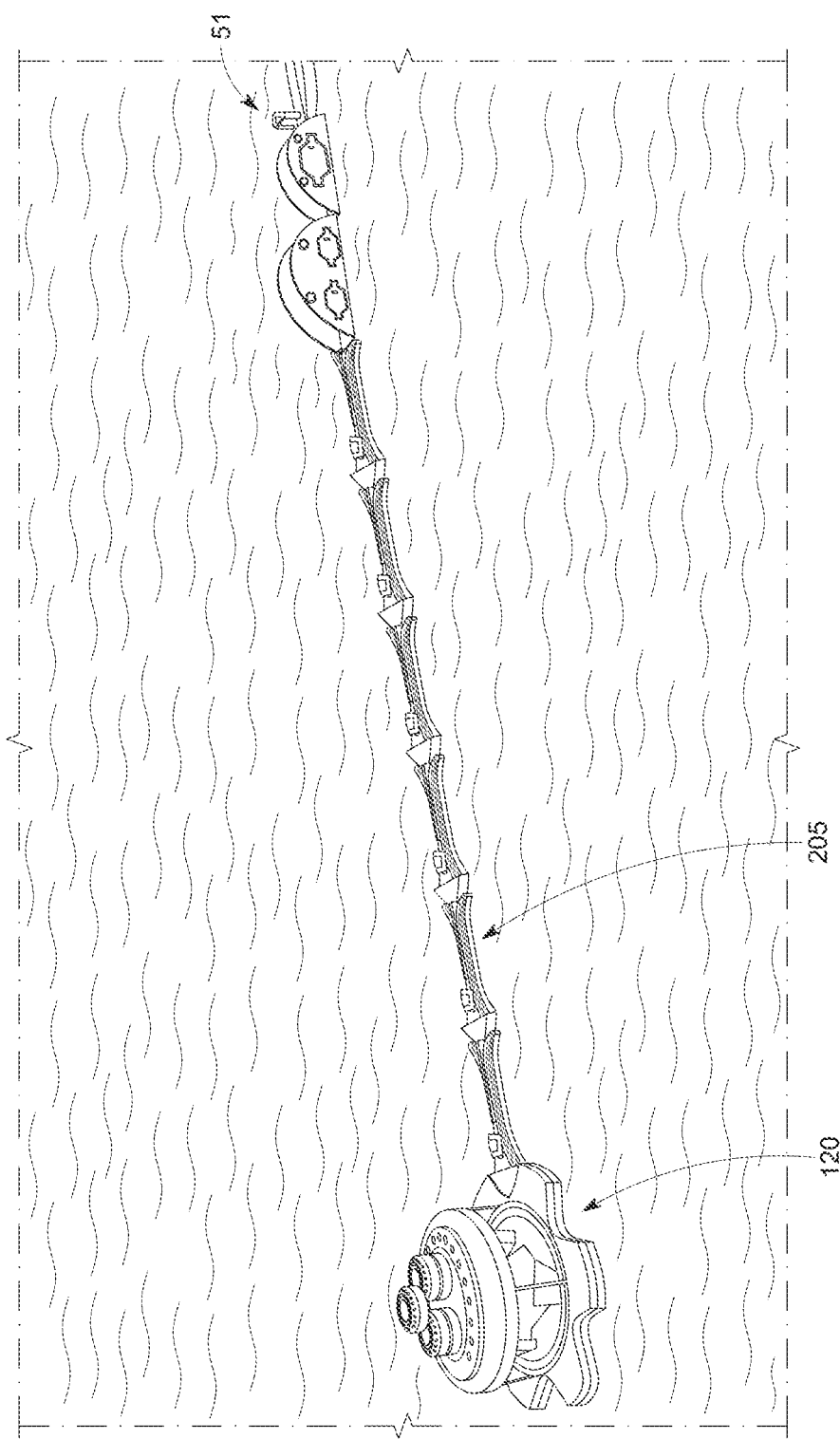
FIG. 30 depicts components of another landing system, hitched in line for towing.

FIG. 27 and FIG. 28, and FIG. 30 show that the entire pod 100 can be relocated if original location is no longer economically feasible. System 95 could be disassembled into its constituent parts such as spokes 205, pods 100, hanger 2710, base 120, etc. Then these components could be reassembled into a chain of components to be towed by boat 51.

Some versions of the air taxi could have up to six terminal strips or more, each connected to a circular walkaway in the center of base 120 with pods 100 stacked on top. Some versions could have fewer than six terminal strips.

FIG. 28 shows spoke 205, and pod 100 chained together to be pulled by a tugboat. Single pod 100 connects to the end of the chain.

Figure 29:
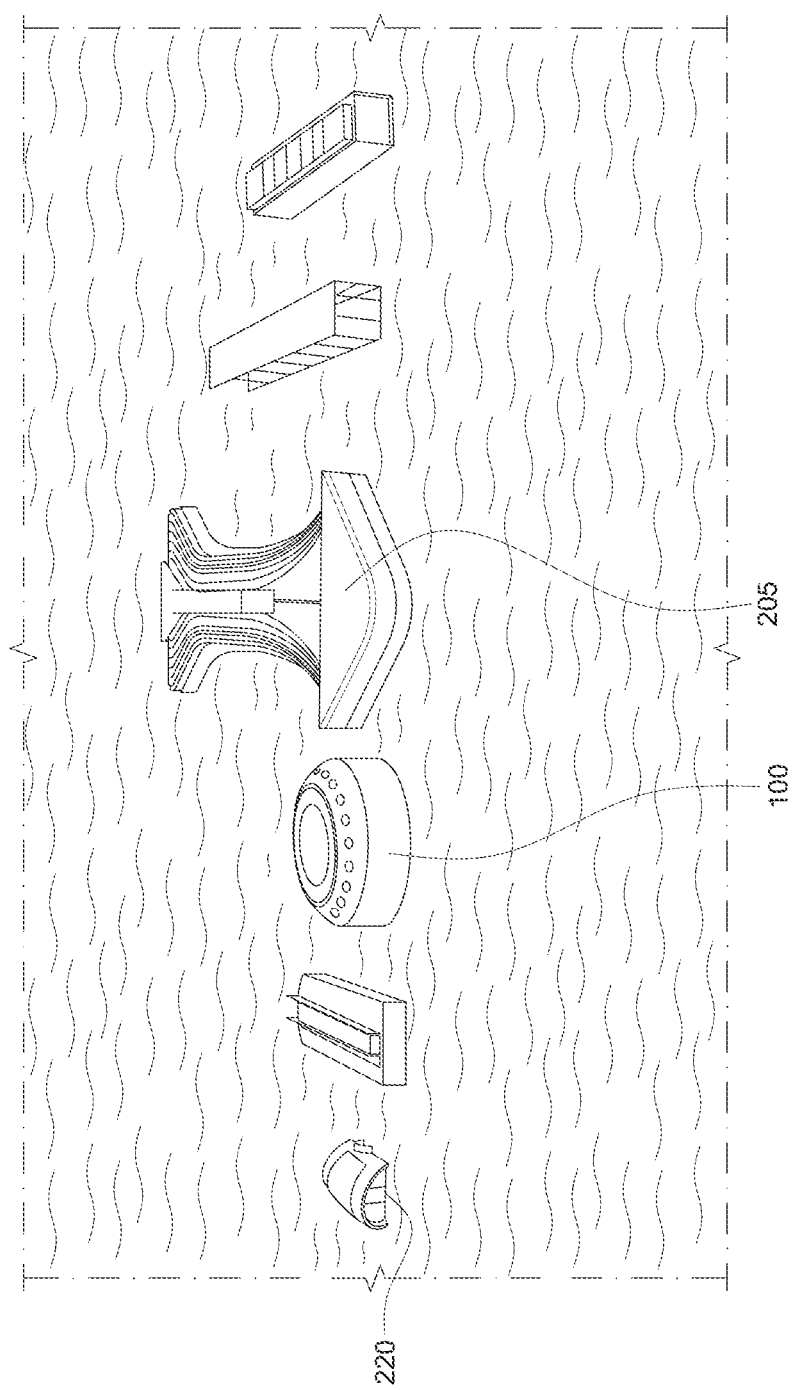
FIG. 29 depicts individual components of a landing system.
Figure 31:
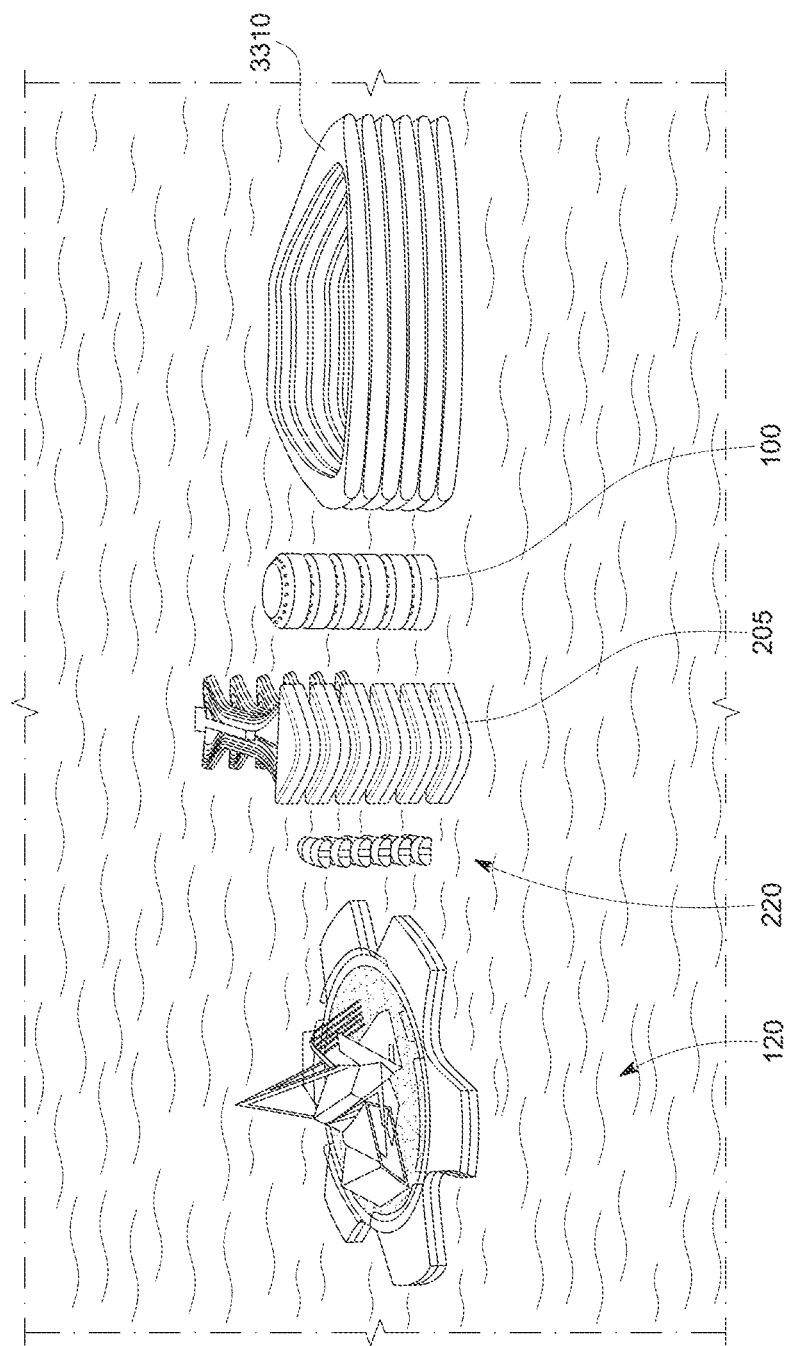
FIG. 31 depicts components of another landing system with the components stacked.
Figure 32:
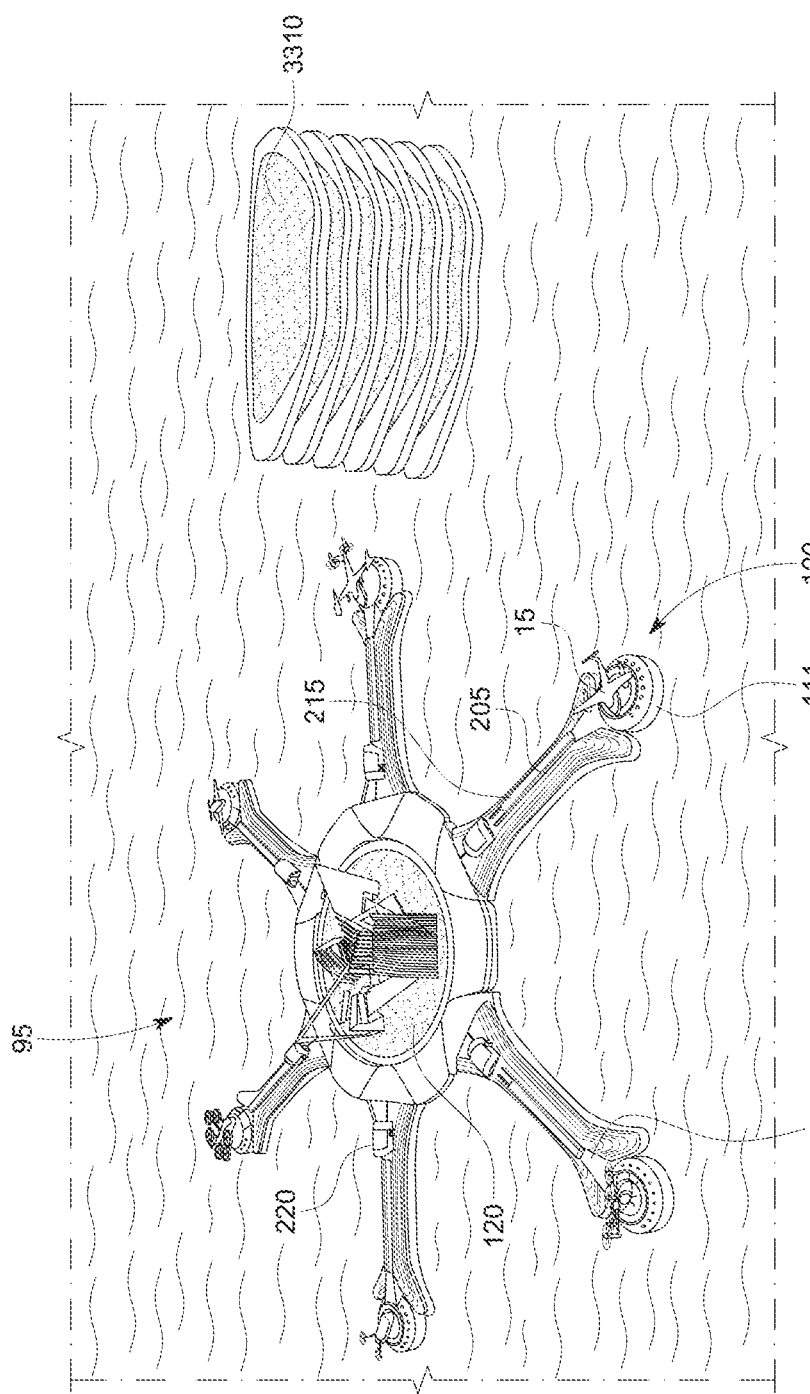
FIG. 32 depicts additional components of a landing system.

FIG. 29 and FIG. 31 show base 120 disassembled.

FIG. 30 depicts base 120 with six spokes 205 connected to it.

FIG. 47-FIG. 52 shows a dome 4000 placed over pod 100. The dome can be a standard size to fit over pods 100. This is ideal during the winter months and will help insulate pods 100. Dome 4000 will protect base 120 from getting wet from rain or snow. So, passengers will not have to worry about getting wet when on the circular walkway 4210.

Figure 33:
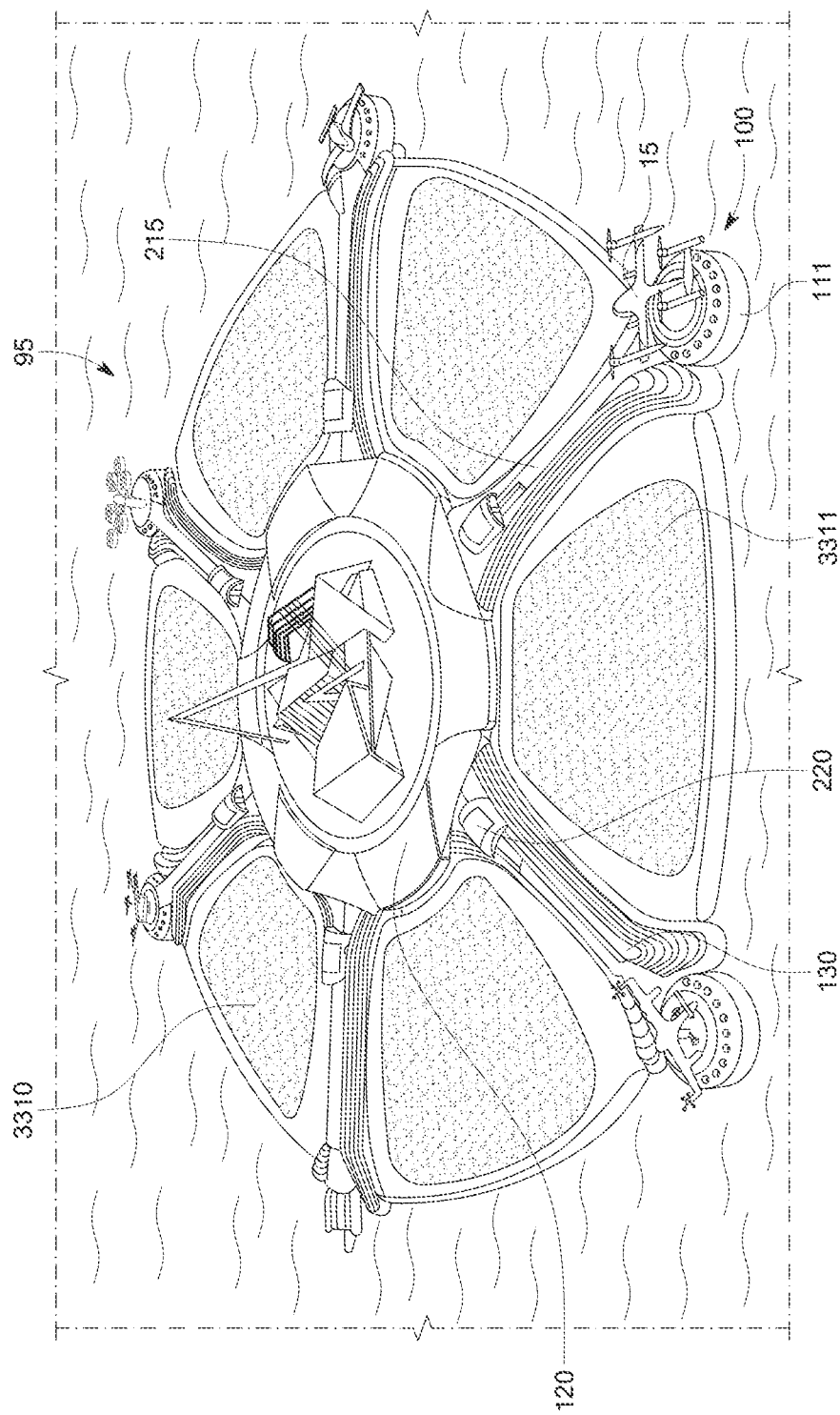
FIG. 33 depicts an alternative landing system.
Figure 34:
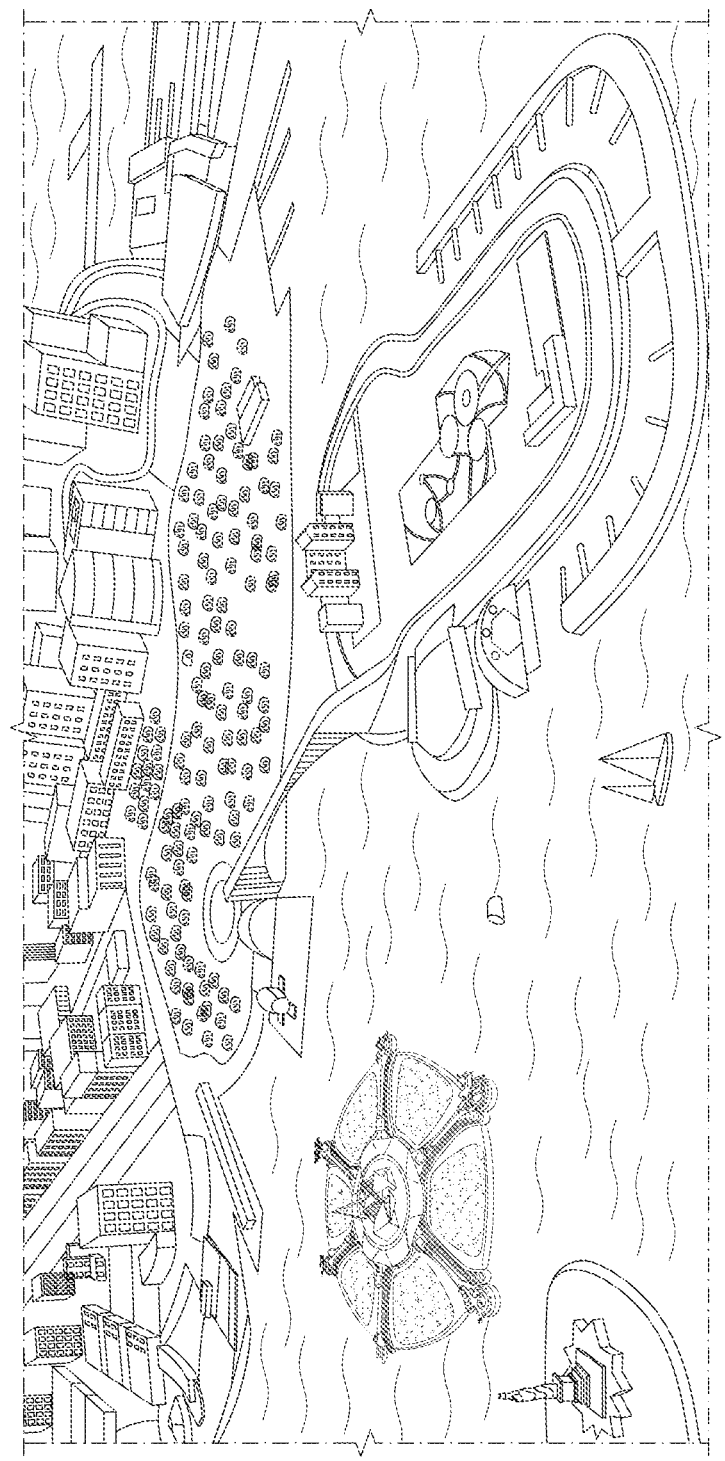
FIG. 34 depicts the landing system of FIG. 33 shown in relation to a city.
Figure 35:
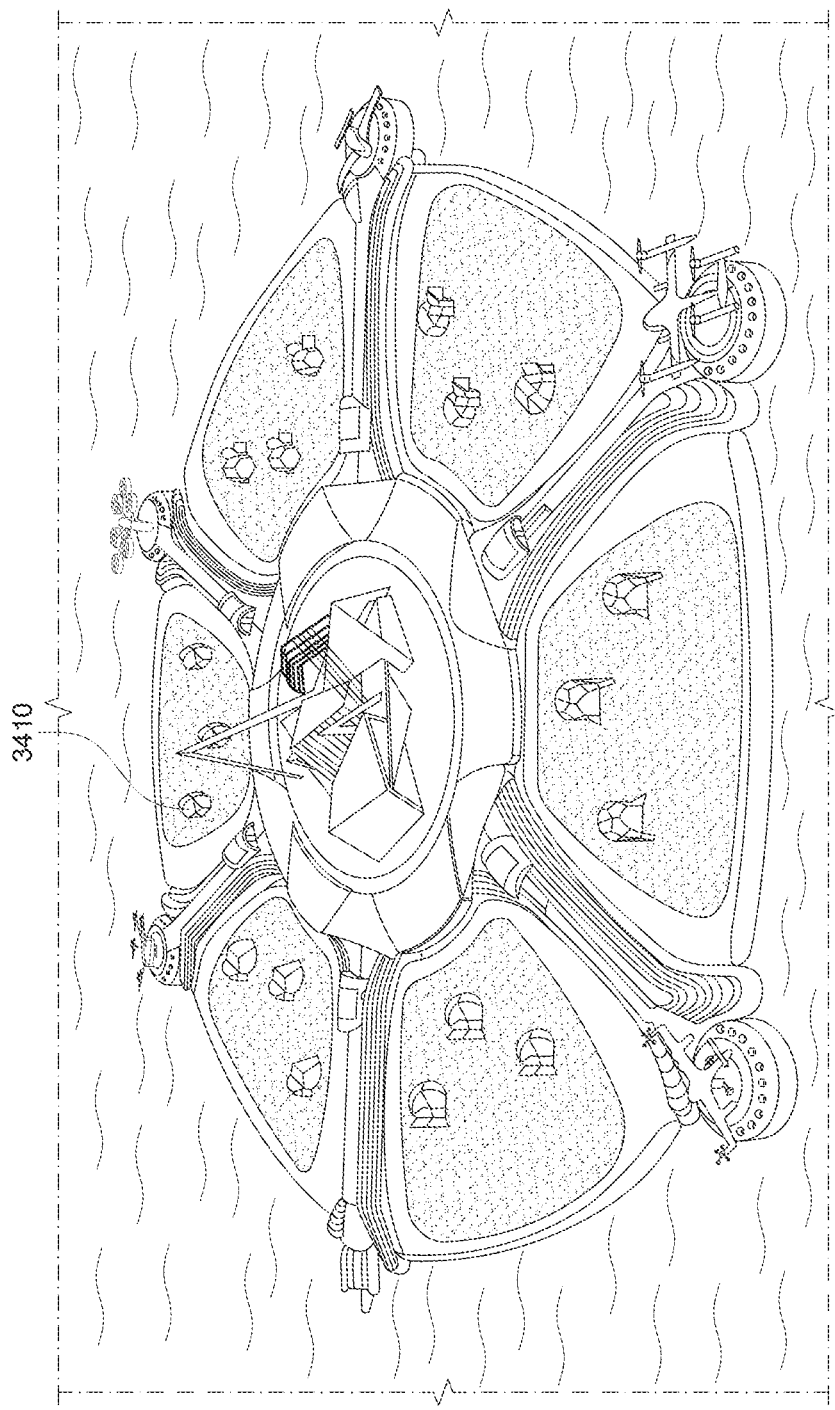
FIG. 35 depicts an alternative landing system.
Figure 36:
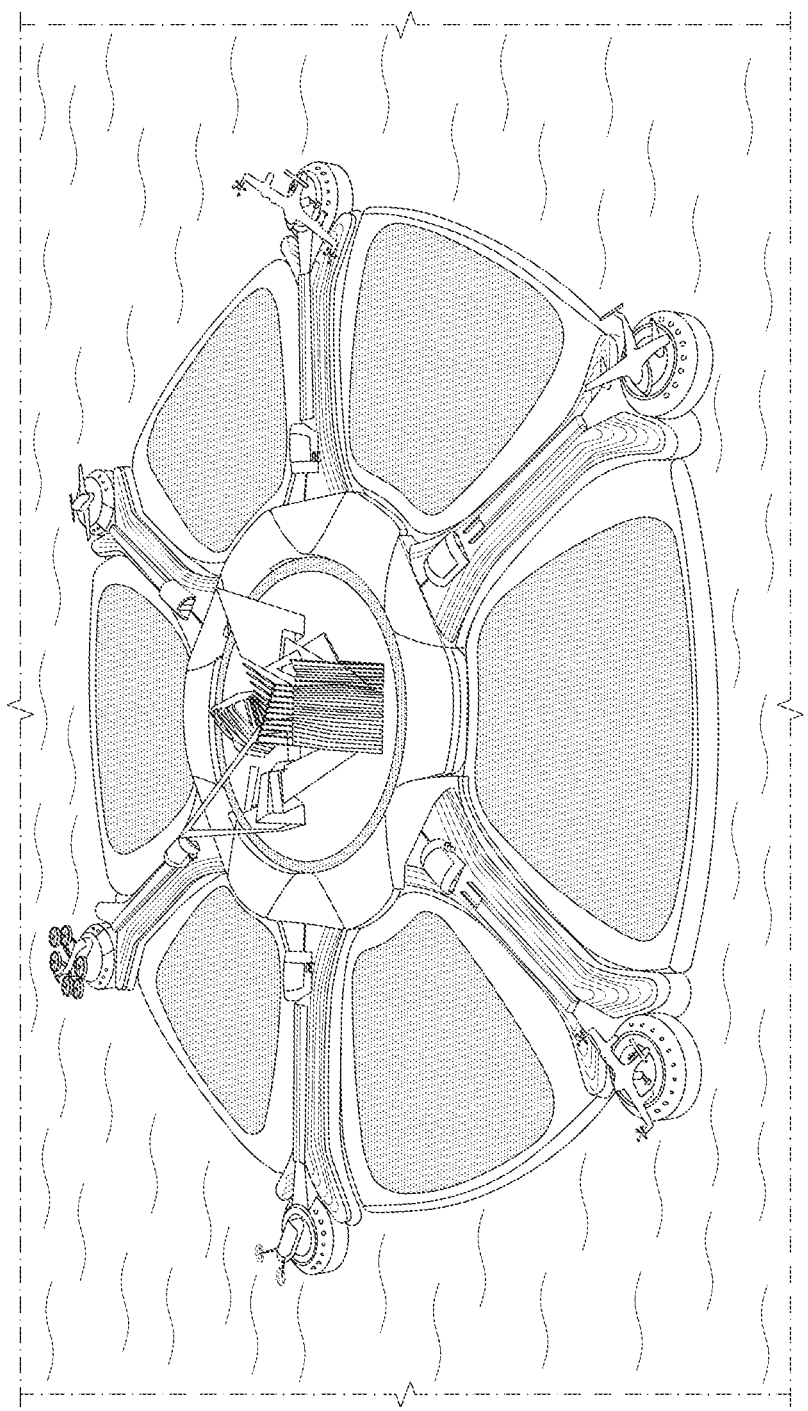
FIG. 36 depicts an alternative landing system.
Figure 37:
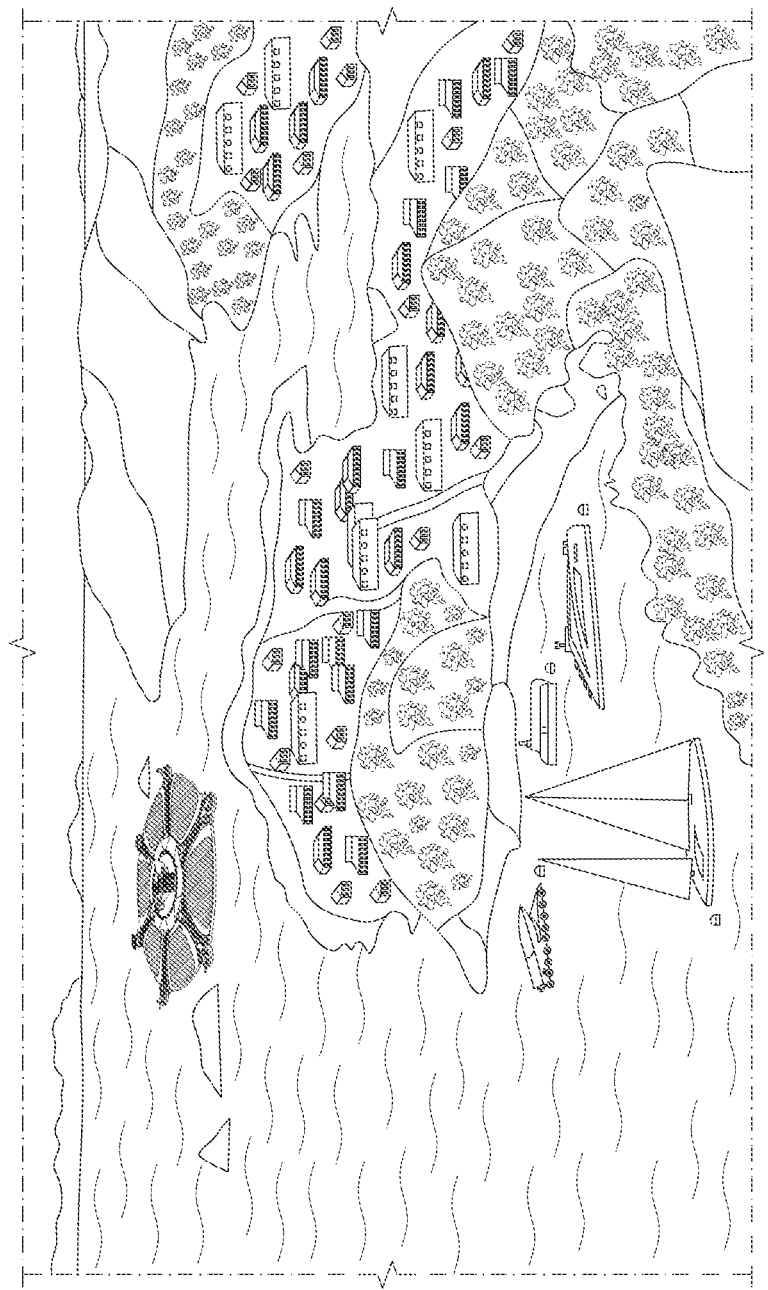
FIG. 37 depicts an alternative landing system.

FIGS. 31-FIG. 43 show alternative landing systems. FIG. 35 shows an arrangement that could be used in the event of another pandemic. Base 120 can be dedicated as a place for commuter quarantine when arriving from the airport. It can mainly be used in times when there is no vaccine for a virus outbreak. Temporally housing can be built on pod 100. A section can be placed between each pod 100 that will cover the housing. FIG. 33 shows a version with infills 3310 having grass or artificial grass 3311.

Figure 38:
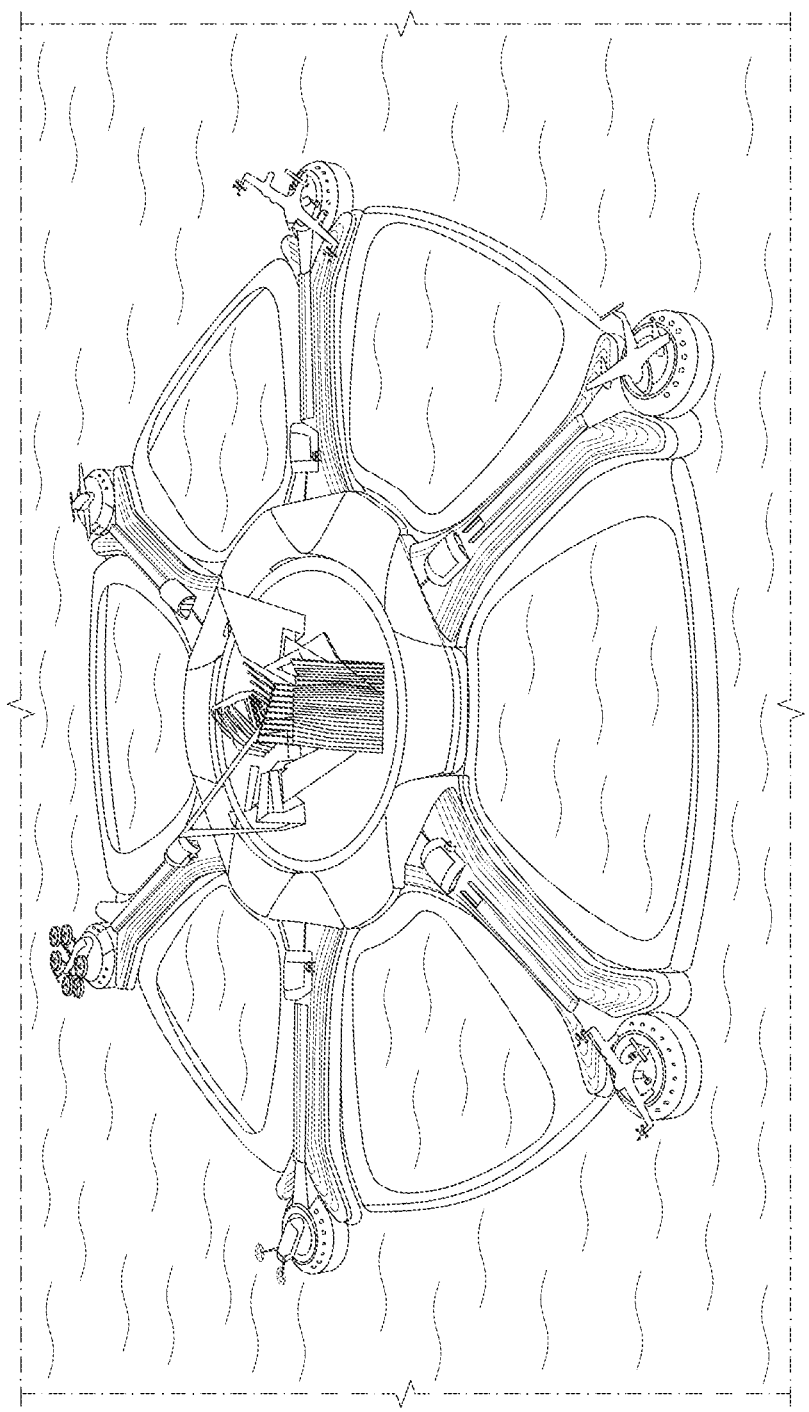
FIG. 38 depicts an alternative landing system.
Figure 39:
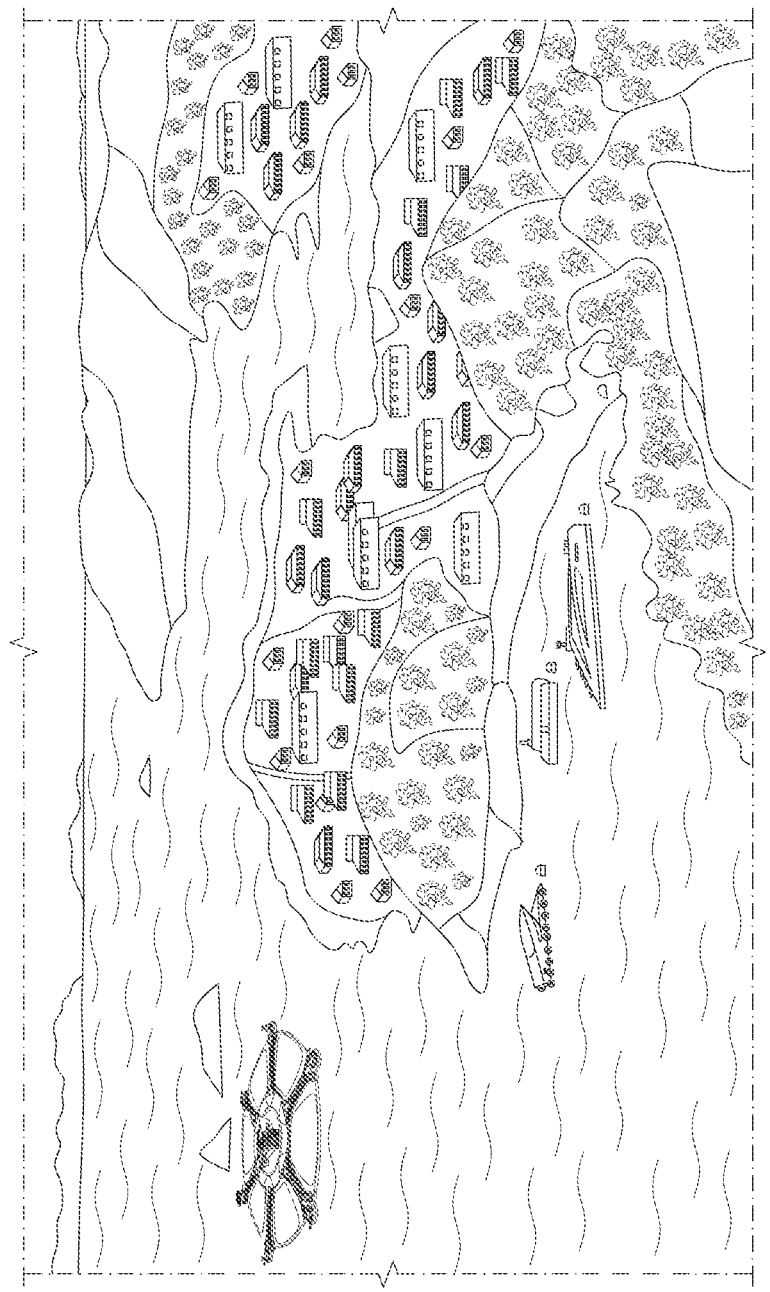
FIG. 39 depicts an alternative landing system.

FIG. 38 and FIG. 39 show versions with glass-bottom infills that connect between each pod 100. This will be ideal for base 120 located on the Caribbean islands. The glass-bottom pieces will allow commuters to see the tropical fish under their feet, for instance. Furthermore, some versions of base 120 for the Caribbean will light up in LED colors, so at night commuters, for instance, will see a blue light under the glass and see the fish. There can also be a glass-bottom dance floor at base 120. The LED lighting will overall enhance the ambiance of base 120.

Figure 40:
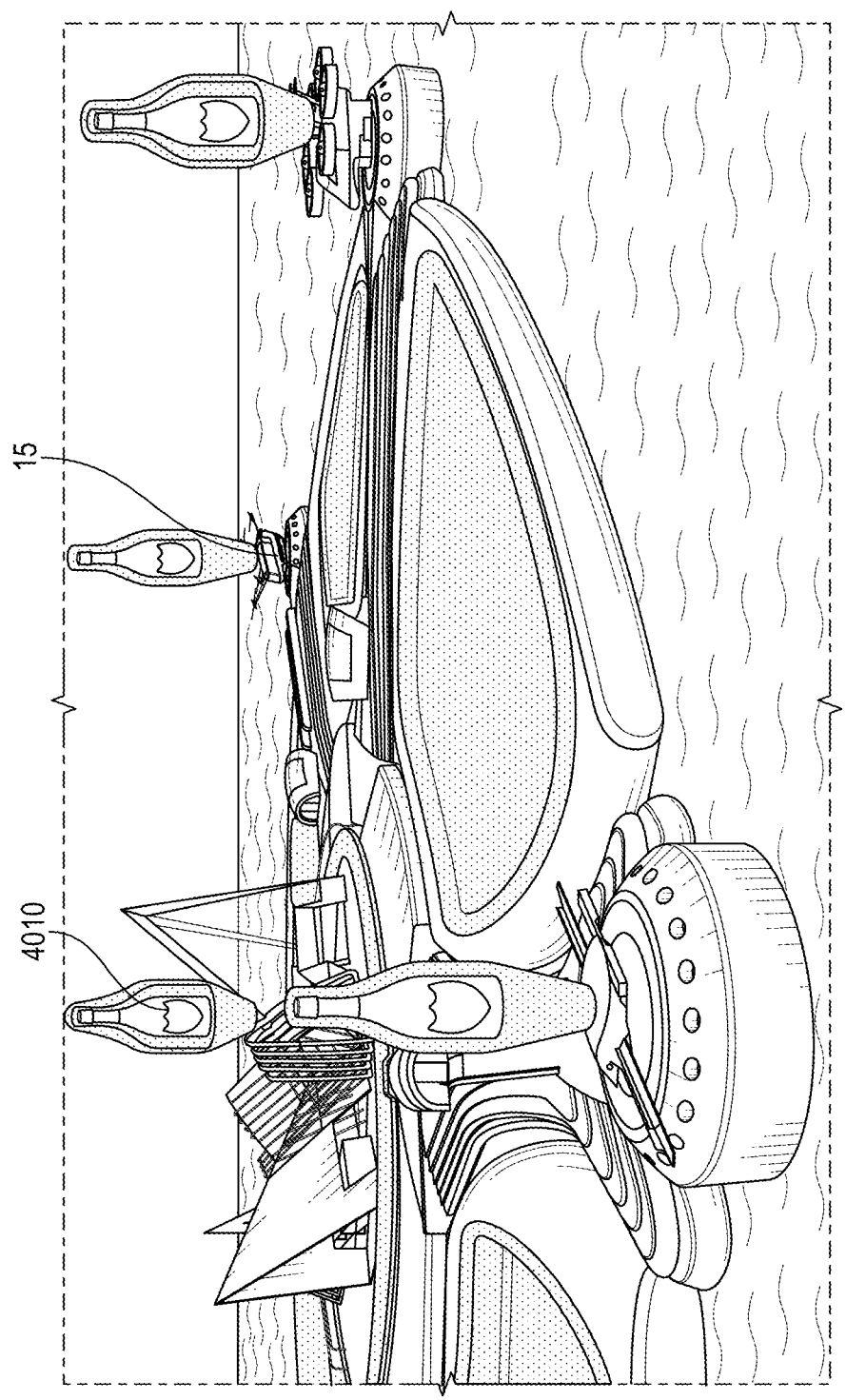
FIG. 40 depicts an alternative landing system.
Figure 41:
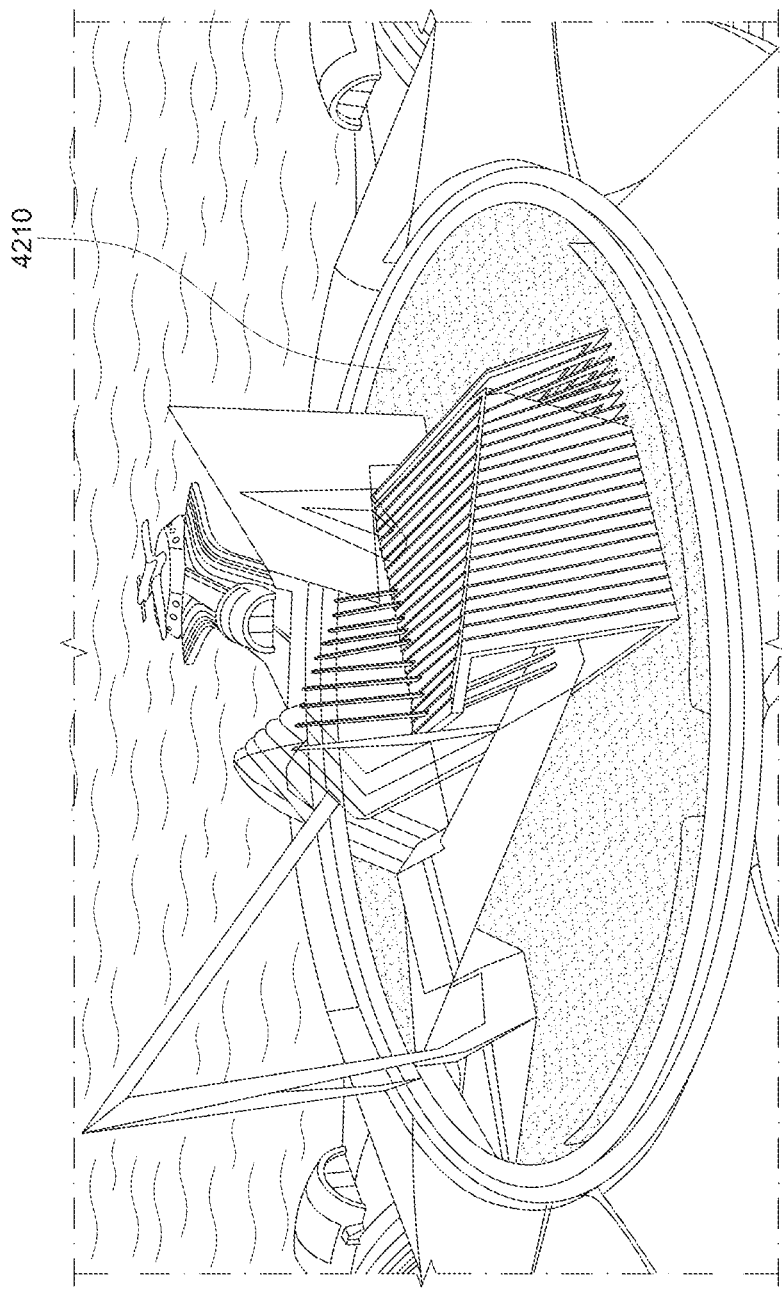
FIG. 41 depicts the close-up version of a landing system.
Figure 42:
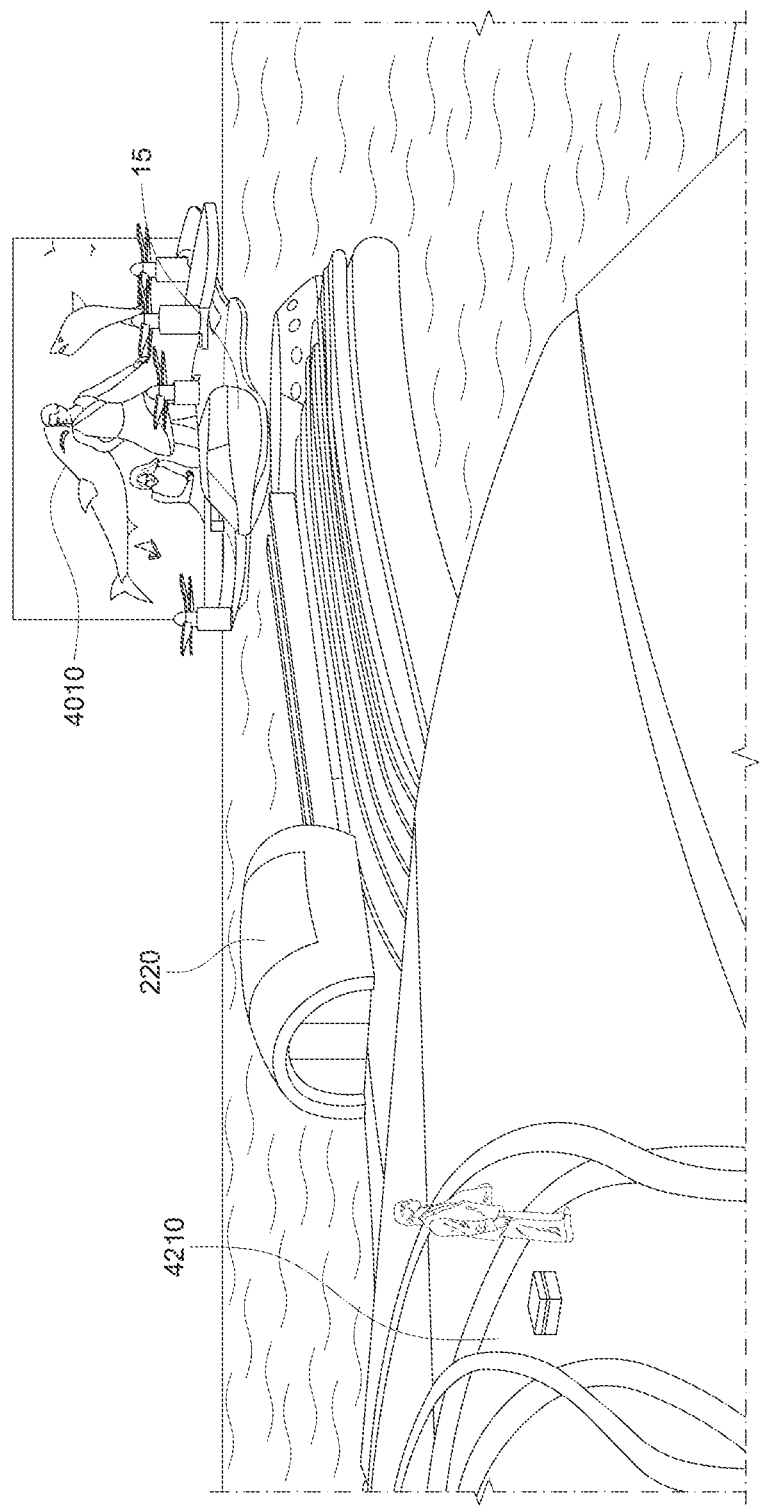
FIG. 42 depicts components of a landing system.
Figure 43:
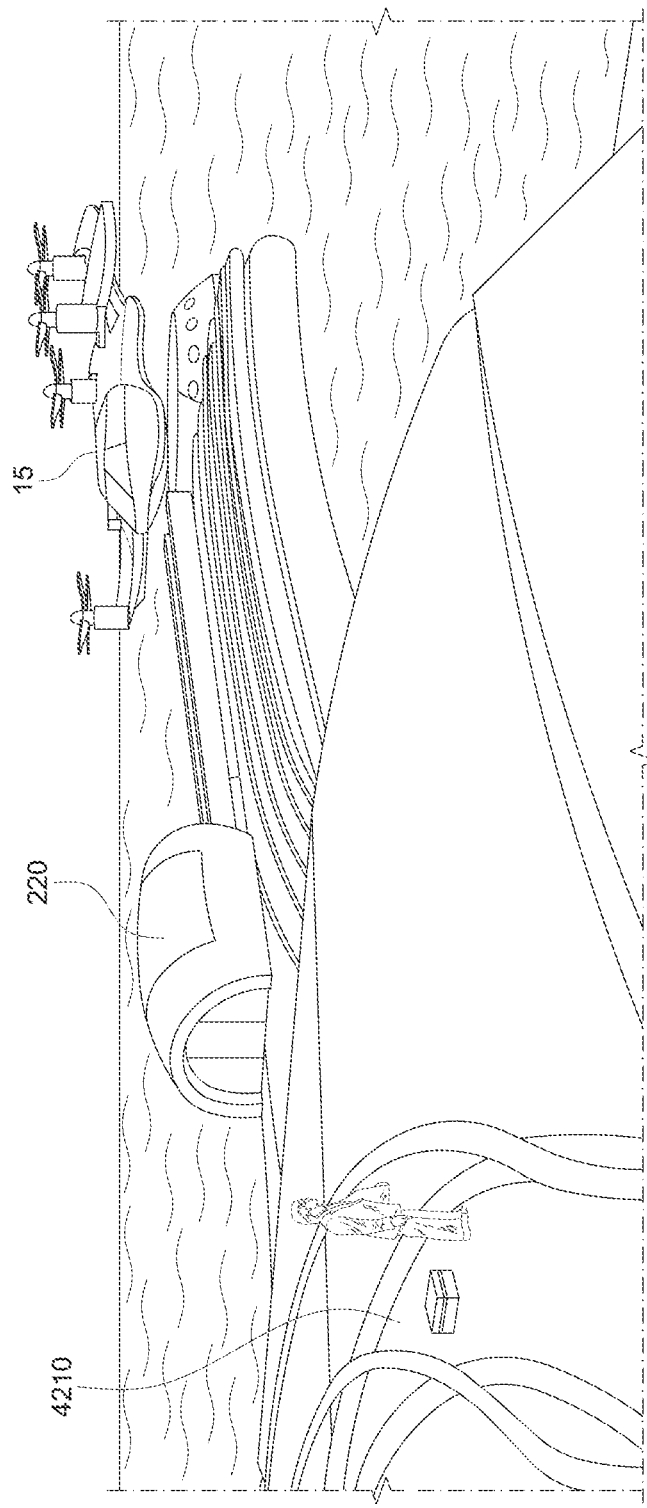
FIG. 43 depicts components of a landing system.

FIG. 40 depicts base 120 with glass inserts that could turn into a color-changing nightclub on each glass insert. In addition to this, companies can sponsor the event by having hologram ads 4010 played above the air taxis on a prior art hologram fan. The center area starting from the moving walkway can rotate 360 degrees as well. The colors of the glass plates can change with the beats of the DJ.

Using the extra pieces to enlarge base 120 would make it an ideal location for a concert, party, or auto race, for example, a Grand Prix Monaco event held at the air taxi Monaco. One-piece, for instance, can be dedicated to a sit-down dinner under tent 3410 (see FIG. 35). Another piece could support a Ferris wheel, a stage for a concert, or a medical tent.

Because it's located away from the mainland, base 120 would be an ideal choice for world leaders to meet since the location can be easily protected from terrorists.

Pod 100 will have circular moving walkway 4210 connecting each pod 100, and at night can be lit up with colored lighting such as magenta for instance.

Figure 44:
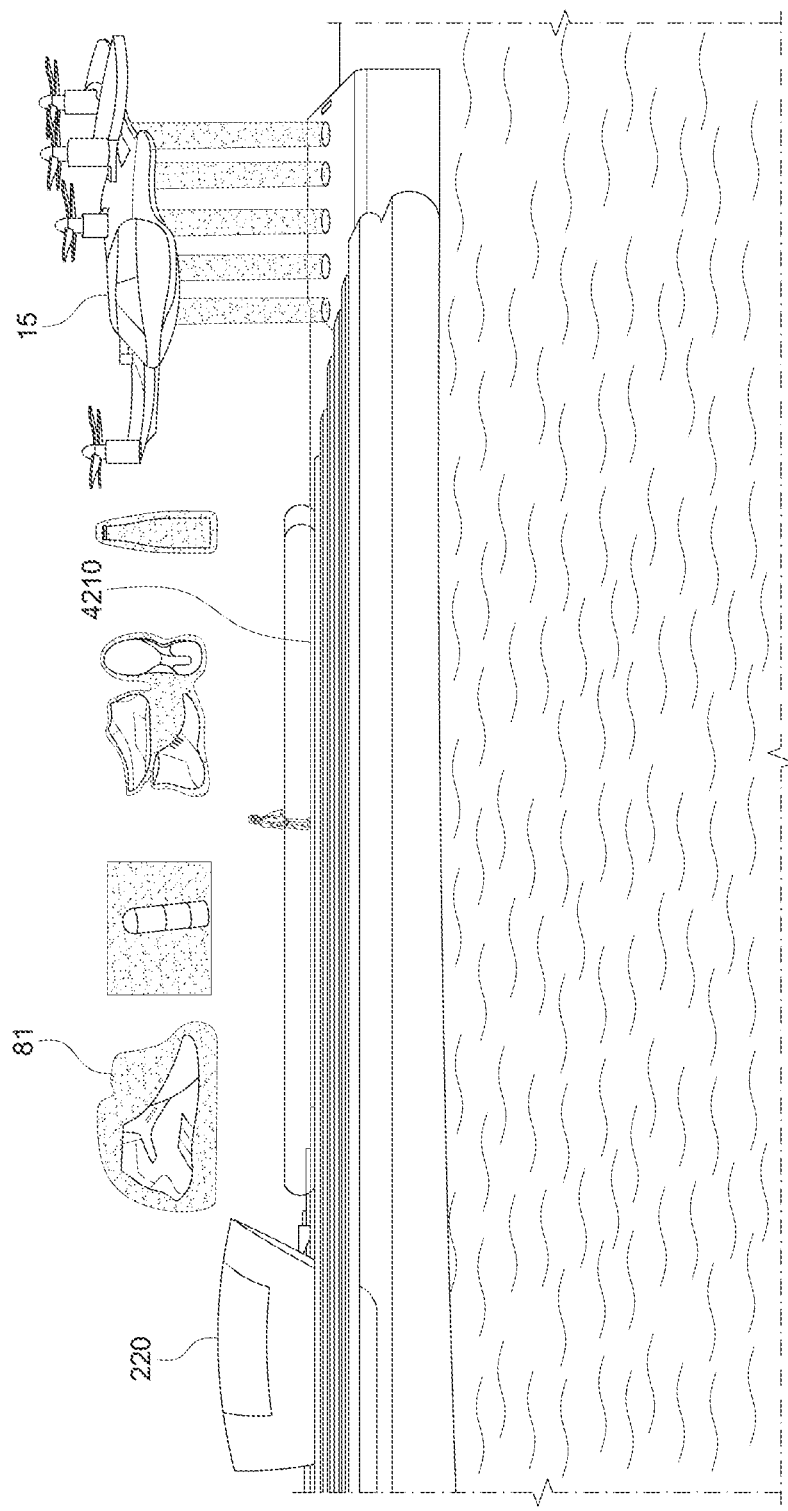
FIG. 44 depicts various hologram advertisements associated with a landing system.
Figure 45:
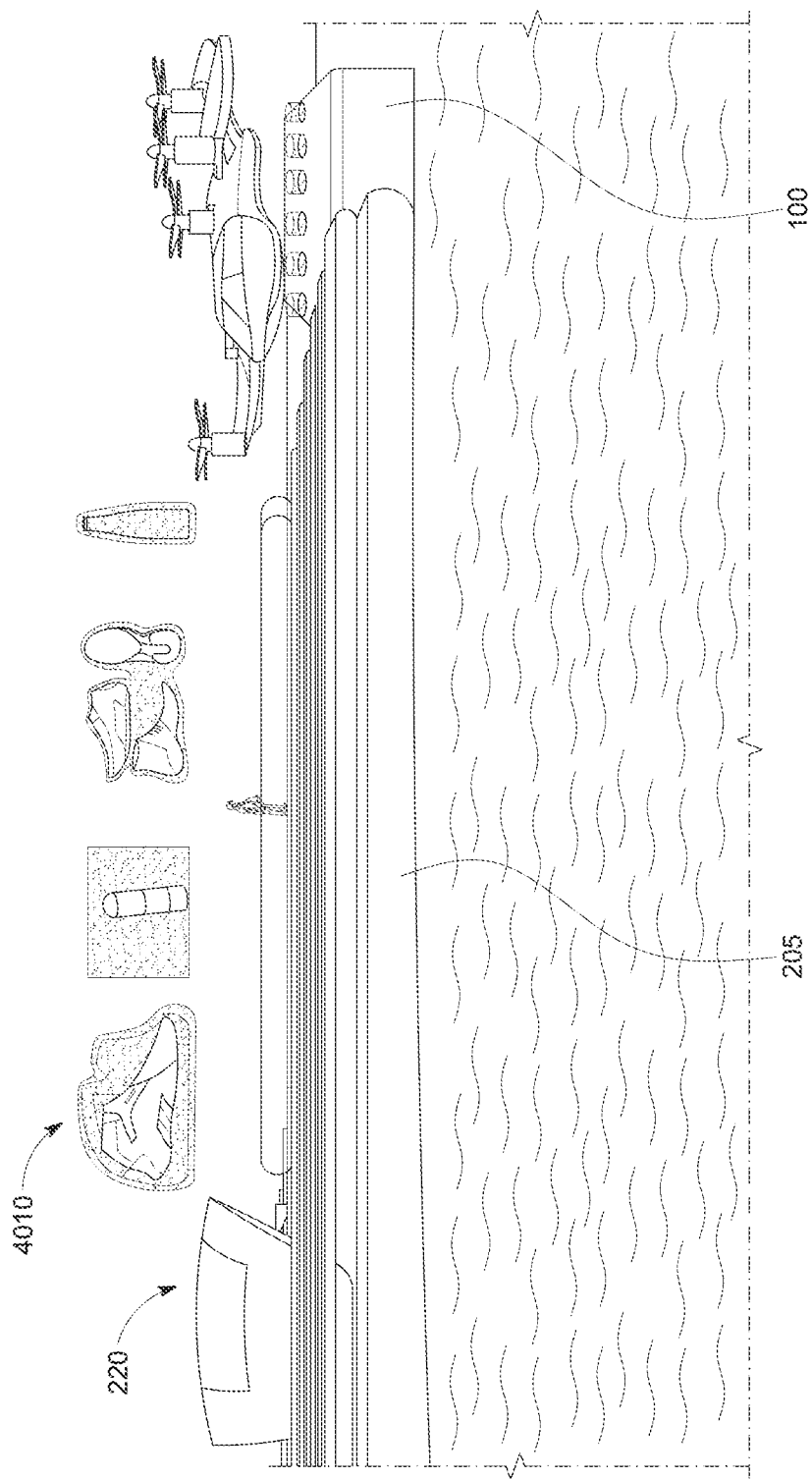
FIG. 45 depicts various holographic advertisements associated with a landing system.

FIG. 44 and FIG. 45 depict different versions of base 120 showing spoke pathway 215 between the moving walkway and the entrance of pod 100. These figures also depict hologram ads 4010 projected onto hologram fans. The traveler will first scan the ticket and then will go on a moving walkway that will bring the traveler to air taxi 15 at the end.

Some versions of pod 100 will require the air taxis to be equipped with a safety seat belt going over the shoulder.

The traveler will have an option to book restroom stall 310 on the air taxi app. If the traveler does not want others to see their place in line, they can make themselves a cartoon avatar on the app if waiting for restroom stall 310. The person's turn for restroom 300 is based on who booked restroom 300 first on the air taxi app, not who gets there first. The traveler will get information on the nearest bathroom stall 310 number or individual restroom 300 available on pod 100 and the estimated time of arrival. On the air taxi app, it will show them an image of the restroom stall's 310 number with a green light that indicates it is available and red implies it's occupied. The traveler will get a PIN texted to the phone when booking and use a code to enter the stall 310. If there is just an individual restroom then it will show on a map and can be booked on the app. Both restroom stalls 310 and individual restrooms 300 will be equipped with UV light, which will sanitize everything each time the door is closed and won't reopen until the UV lighting sanitizing is completed.

If an air taxi breaks down, it can be placed on pod 100 with the aid of a crane from a boat, and pod 100 piece will detach from base 120 and will be pulled by a tugboat to a maintenance shop along the coast. This is a cost-effective way to bring the air taxi for repairs at the maintenance shop.

The air taxi will have a flight path to follow, similar to how boats follow where red stays on the right and green on the left when return. They will be drone shape buoys in the sky and will be on a flight path below commercial planes for safety.

Some versions of base 120 can have an area designated for fishing.

Some versions of pod 100 will be equipped to make them handicapped accessible.

Some versions of pod 100 can be equipped with outdoor speakers.

Some versions of pod 100 can be equipped with de-icing technology so the aircraft can fly in the winter.

Some versions of pod 100 will be equipped with Wi-fi.

Some versions of pod 100 can have a playground.

Some versions of system 95 will have an air traffic control tower.

Some version of pods 100 will have blocks in the bottom of the sea can be used to hold down pod 100 using a chain.

Some versions of pod 100 will have a railing at a child-safe height.

Some versions of pod 100 will have a big screen for theater entertainment.

Some versions of pods 100 will have charging stations or a smart safe.

Some versions of pod 100 will be equipped with a digital clock that will display by the gate showing the time remaining and display any delay information.

Information about delays and flight arrival and departure times will be updated on the air taxi app.

It will be standard for base 120 to have Fire extinguisher for safety throughout base 120.

Water from the sea could be used to supply hoses on pod 100 to put out any fire.

The air taxis will be equipped with a hose to clean air taxis as well.

Some versions of pods 100 will have flowers, a garden, and an irrigation system.

Pods 100 will have both ac and a heating system.

Taxi Boats will be notified by text or email if pod 100 is above capacity and won't take in any new passengers if at capacity. The legal limit could be set by pod 100 owner or government.

Smart colored lighting that changes colored with the music will be present in some versions of pod 100.

The lower level of pod 100 will have parts needed for repair. It also will be used as a storage place for food and water, and even a jet ski to get someone back to shore in need of medical help.

Some versions of pod 100 will have a good scent from fragrance machines.

Some versions of pods 100 can be equipped with restrooms that have a section for breastfeeding, which can have stools for children accompanying their mother to sit on and watch something on their iPad while the mother is busy breastfeeding.

Some versions of pod 100 will use suction tube technology to remove garbage from pod 100. I am envisioning a garbage boat, for instance, will have two hoses color-coded—one that is green and another that is blue. On the air taxi pad, for instance, the glass will go in a blue hole and paper in green. The garbage boat will pull to the side of the air taxi and attached the blue hose to the marked blue capsule to suck out the glass and attached the green hose to such out the paper, for instance. Red color could be used for any other garbage, for instance.

Some taxi boat will come with self-driving robotic captains, taking passengers to base 120 from terminal 220 and back.

Some version of pods 100 will have a larger hologram circle beaming up a large ad high in the sky. Some versions of pods 100 in the middle area of pod 100, there will be Hologram DJs, which will imitate famous ones. Pods 100 can be open year-round since air taxis could fly year-round and generate income year-round for base 120 owner. When the last piece gets ready to be towed, poles will be inserted in the round area, and pods 100 placed on top.

Also, the tugboat and the interconnected base 120 will be able to withstand waves greater than 15 feet, so it can be ocean-bound. Regarding the material of base 120, I am proposing it can be made of a "Pneumatic stabilized platform known as (PSP)." A Pneumatic stabilized platform (PSP.) is a technology used to float a very large floating structure (VLFS). PSP uses indirect displacement, in which a platform rests on trapped air that displaces the water. The primary buoyancy force is provided by air pressure acting on the underside of the deck. This technology is used for constructing the floating base 120 for plans in Tokyo and could be used for the construction of the uber air landing pod.

Pod 100 is an ideal choice for transportation in major cities along rivers such as New York, London, Paris, Singapore, Budapest, and Istanbul, just to name a few.

Figure 46:
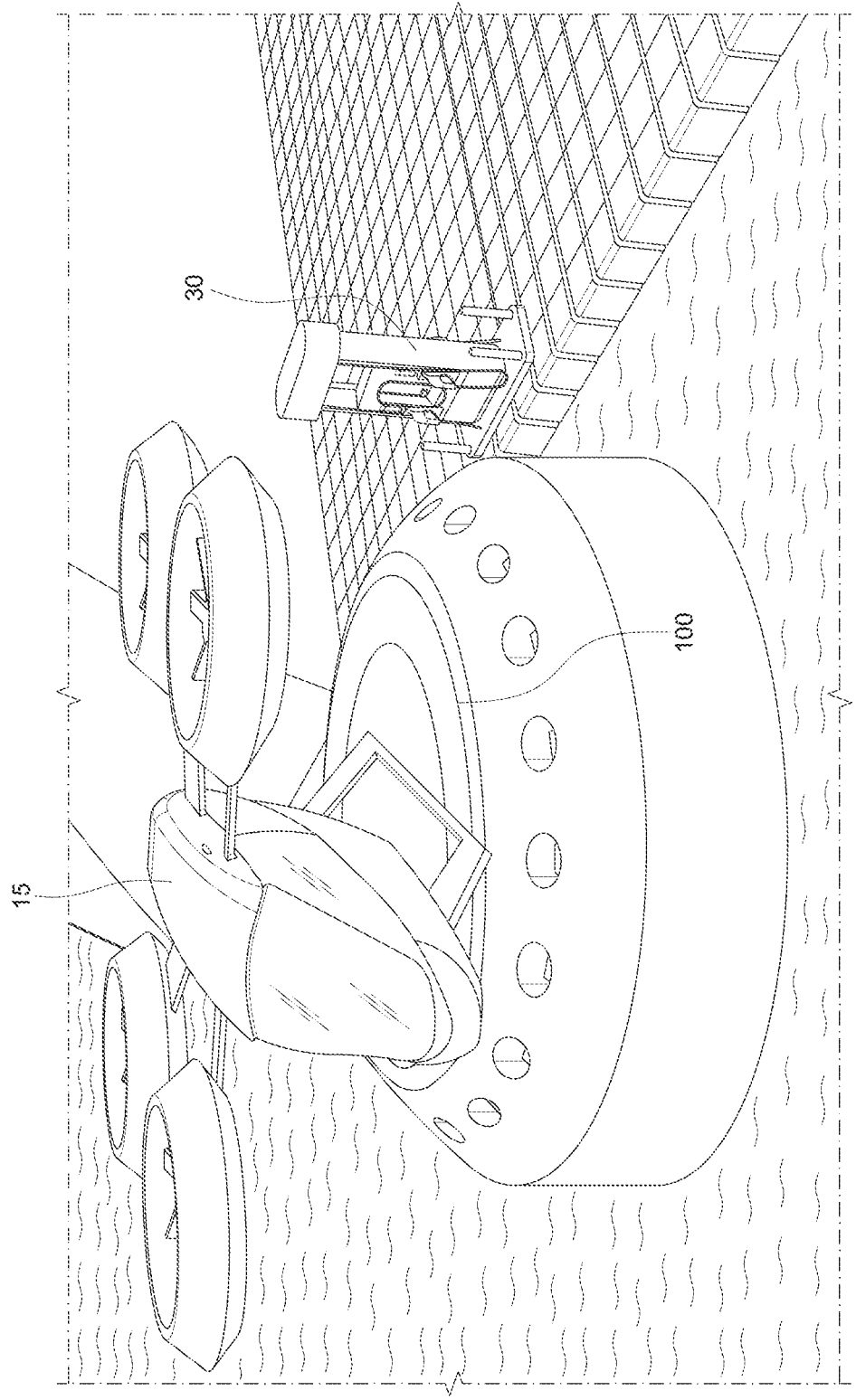
FIG. 46 depicts refueling components of a landing system.
Figure 47:
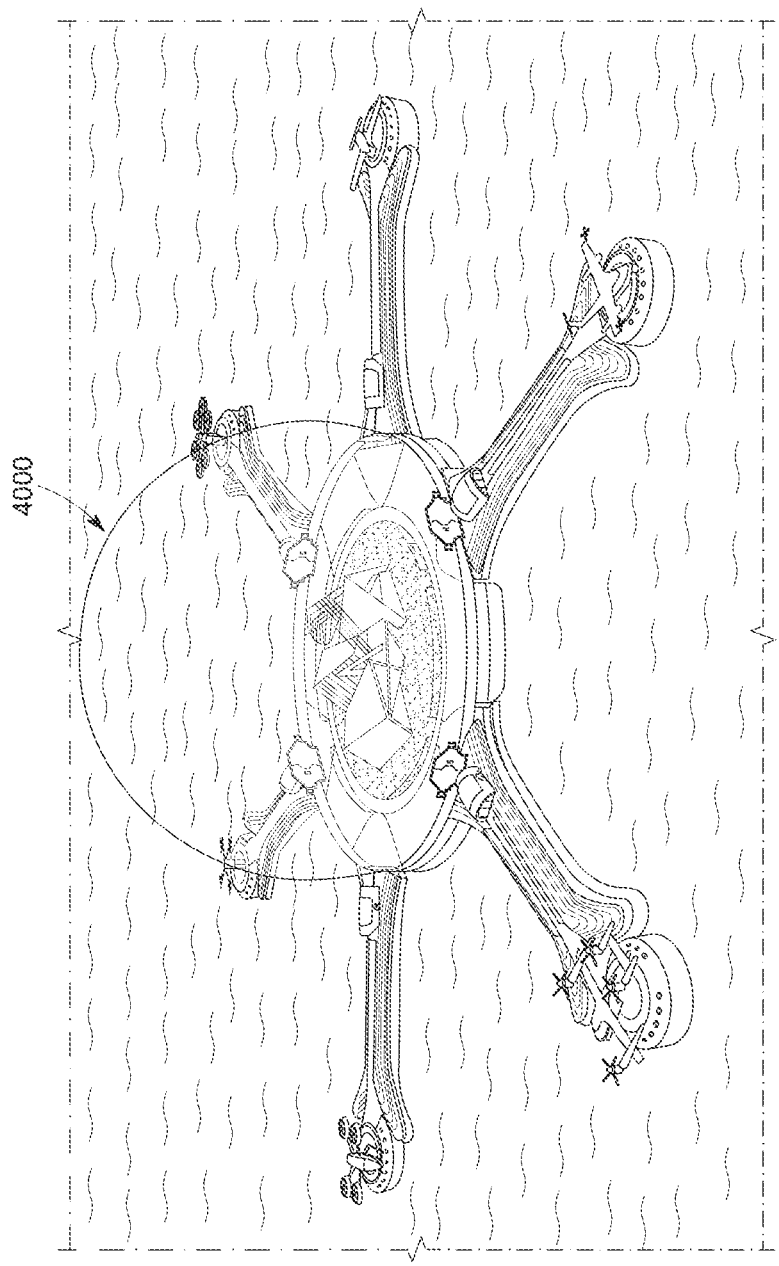
FIG. 47 depicts a perspective view of another landing system.
Figure 48:
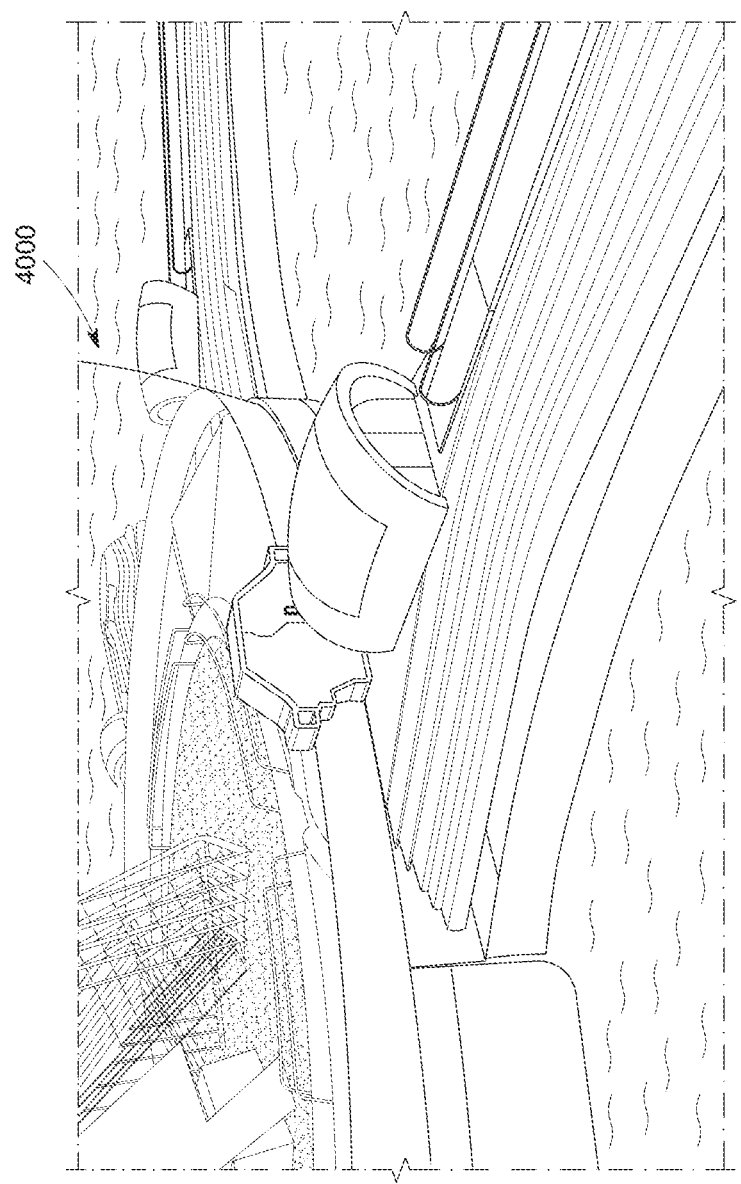
FIG. 48 depicts a perspective view of another landing system.
Figure 49:
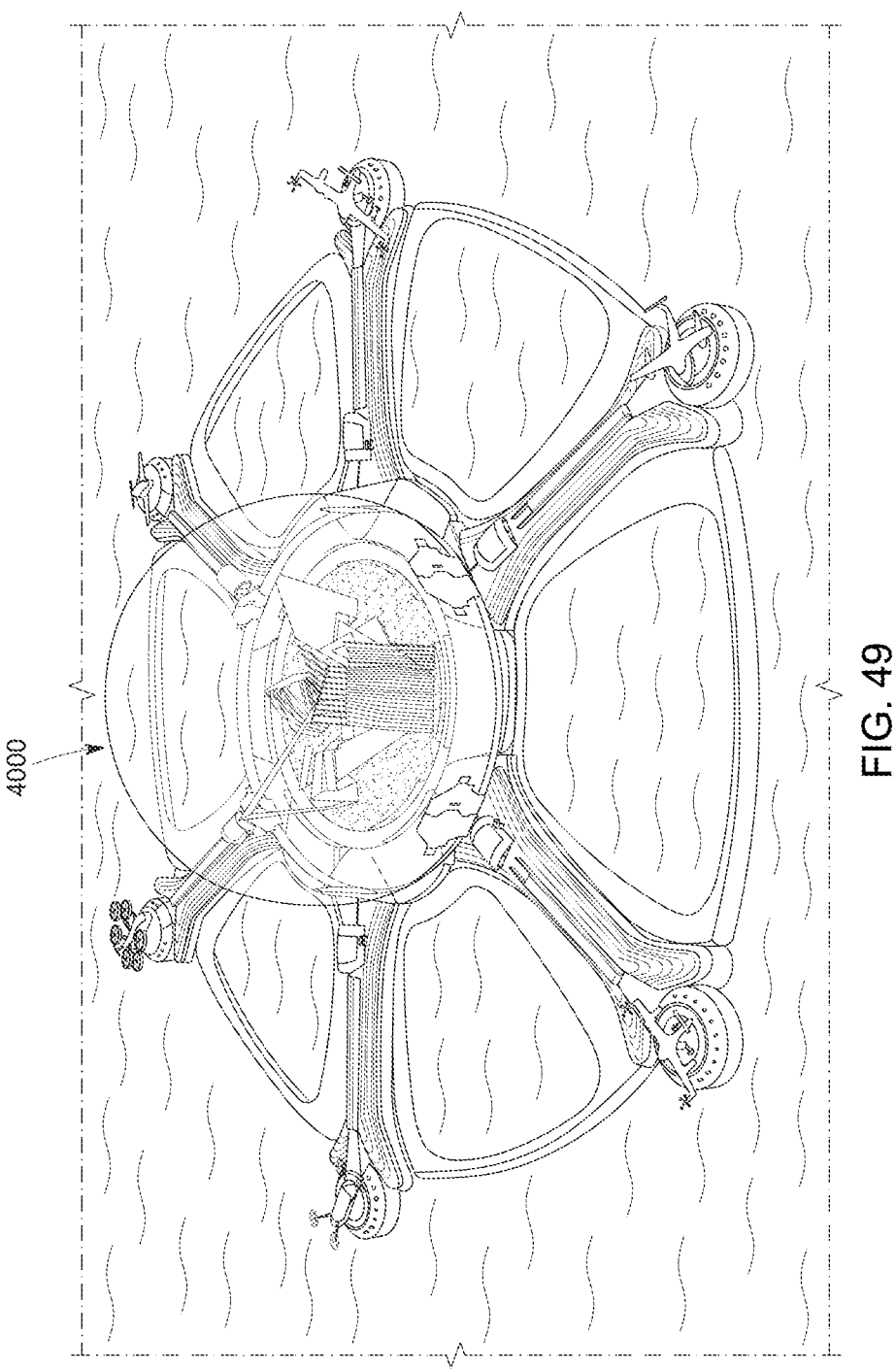
FIG. 49 depicts a perspective view of another landing system.
Figure 50:
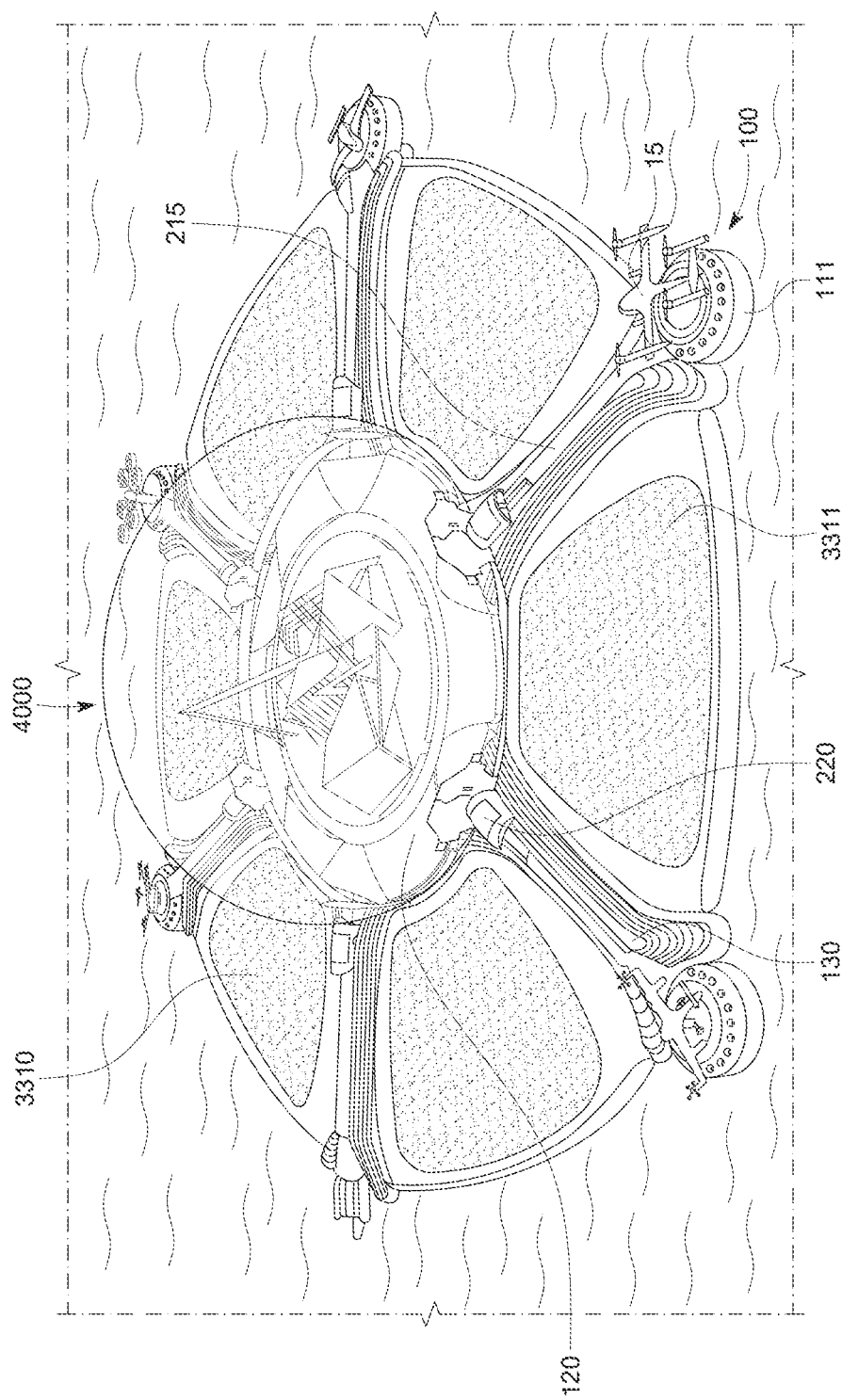
FIG. 50 depicts a perspective view of another landing system.
Figure 51:
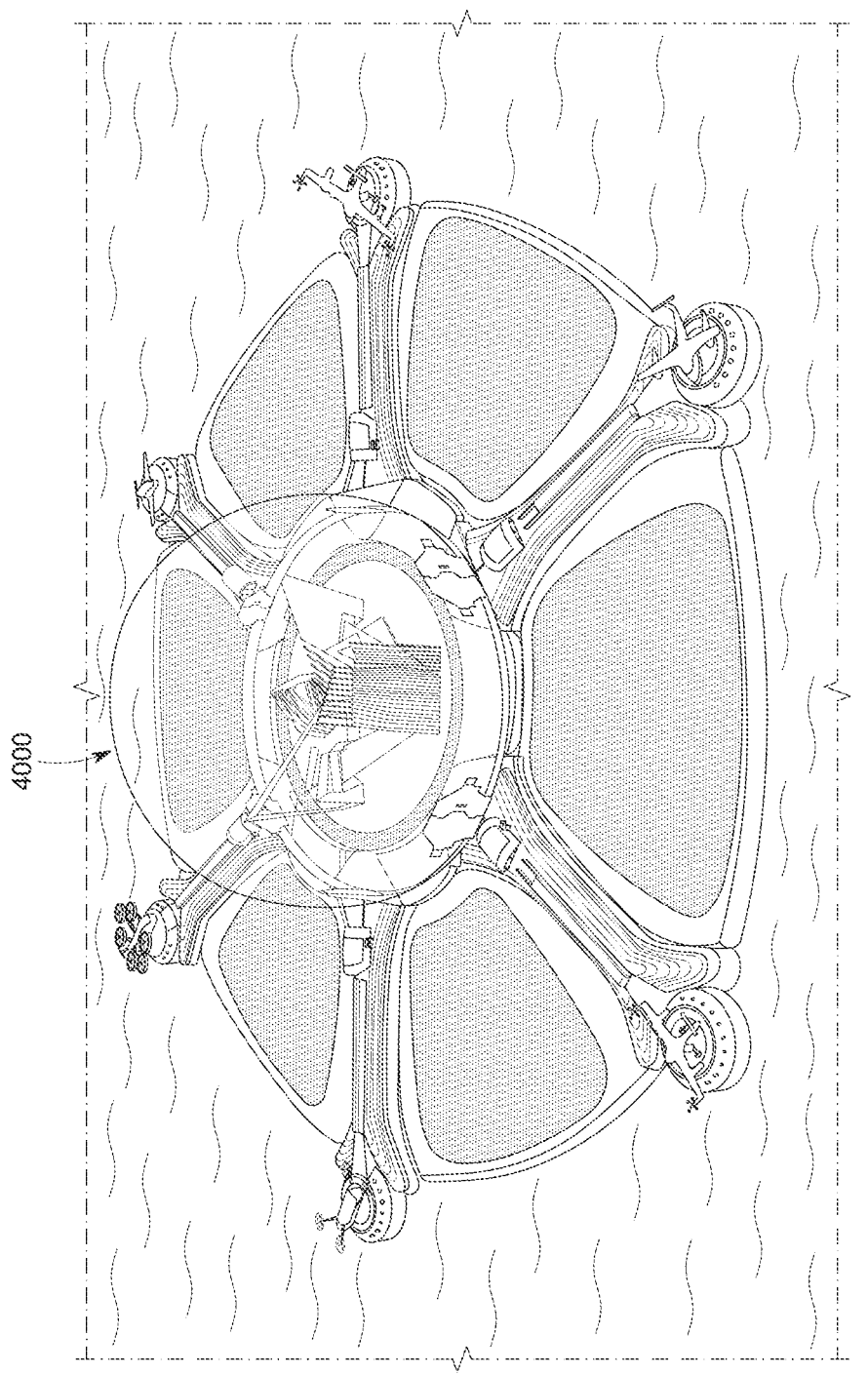
FIG. 51 depicts a perspective view of another landing system.
Figure 52:
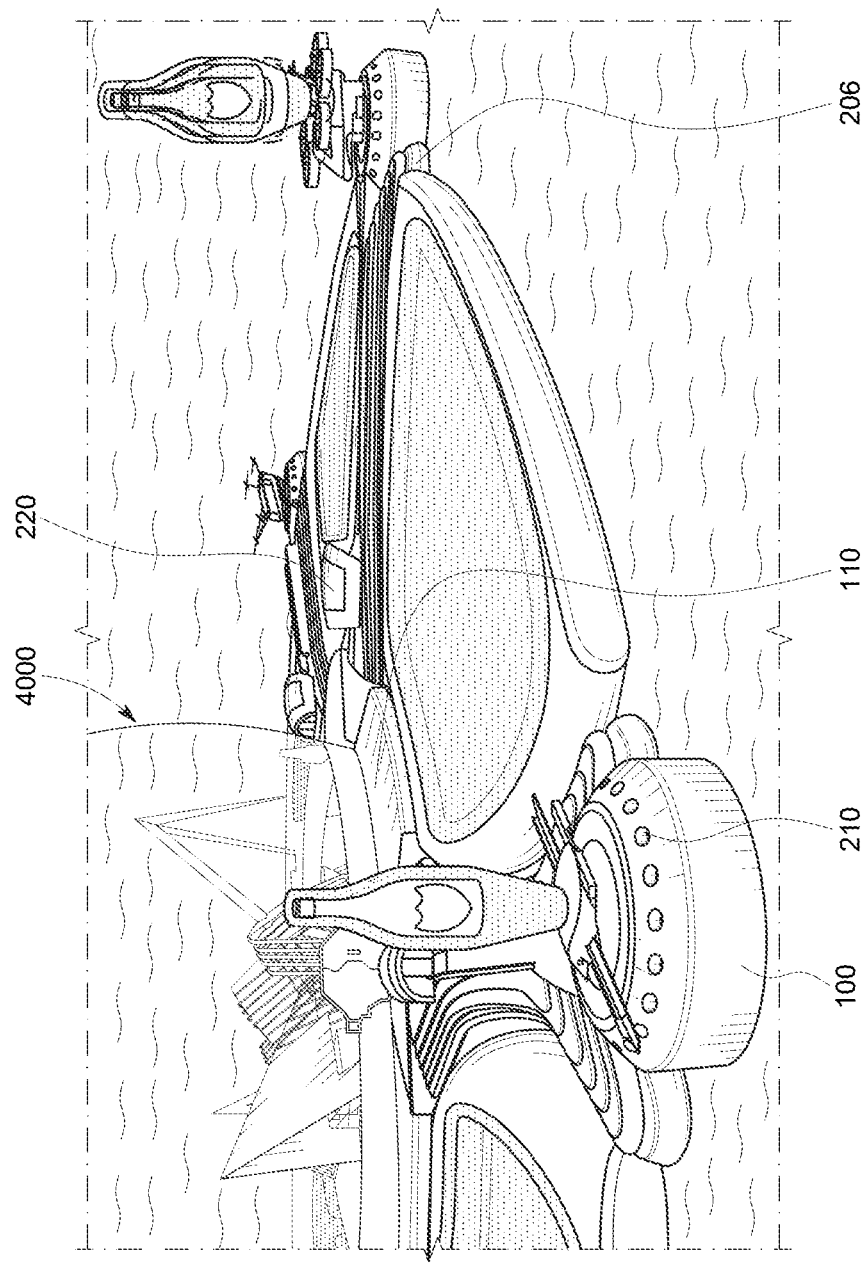
FIG. 52 depicts a perspective view of another landing system.

When the air taxis need to be fueled, pod 100 can be pulled with a tugboat to a fuel pump 30 or electric recharging station 30 located on the barge by the terminal. Some versions of the fuel pump will have an extra-long hose carrying the fuel to the fuel filler on the air taxi. In other embodiments, pod 100 and hanger can also be equipped with a fuel pump 30 (electric recharging station) used to refill the air taxi, tugboats, or water taxis servicing the pods. Pod 100 can be equipped with a fuel tank and have an internal pipeline connecting to other pods. This version can be seen in FIGS. 19 and 46. In some exemplars, electric recharging station 30 is suited to recharging air taxis that are powered by lithium-ion or similar battery.

In conclusion, with my concept of a landing system 95, it will the way of the future. Governments and their citizens will benefit from this. The population will only increase over time, and when people travel an uber air landing pod on the water will be the desired choice verse taking off a building rooftop.

Various exemplars have been described above. For convenience's sake, combinations of aspects composing invention exemplars have been listed in such a way that one of ordinary skill in the art may read them exclusive of each other when they are not necessarily intended to be exclusive. But a recitation of an aspect for one exemplar is meant to disclose its use in all exemplars in which that aspect can be incorporated without undue experimentation. In like manner, a recitation of an aspect as composing part of an exemplar is a tacit recognition that a supplementary exemplar exists that specifically excludes that aspect. All patents, test procedures, and other documents cited in this specification are fully incorporated by reference to the extent that this material is consistent with this specification and for all jurisdictions in which such incorporation is permitted.

Moreover, some exemplars recite ranges. When this is done, it is meant to disclose the ranges as a range, and to disclose each and every point within the range, including end points. For those exemplars that disclose a specific value or condition for an aspect, supplementary exemplars exist that are otherwise identical, but that specifically exclude the value or the conditions for the aspect.

What is claimed is:

1. An air-taxi pod system comprising:
a base having a base hull;
a first pod having a pod hull and an air-taxi landing area;
a stationary spoke having a spoke walkway extending from the first pod to the base, the stationary spoke disposed between the base and the first pod and having a spoke hull;
a second spoke disposed between the base and a second pod or an airship pod;
landing lights distributed around the air-taxi landing area;
a terminal;
a dock associated with at least one of the first pod, the airship pod, the stationary spoke, or the base; facilities for commuter use or reservation located on at least one of the first pod, the airship pod, or the base;
an infill disposed between the stationary spoke and the secondary spoke,
wherein the stationary spoke and the first pod connect through a spoke-pod connection,
wherein the base and the stationary spoke connect through a spoke-base connection,
wherein the spoke-pod connection and the spoke-base connection are designed to withstand 50 to 100 mile-per-hour winds or waves produced by 50 to 100 mile-per-hour winds,
wherein the airship pod is larger than the first pod,
wherein the dock has structure that facilities pedestrian entrance to or exit from a water taxi, and
wherein the facilities include at least one of a bathroom, or a shower.

2. The system of claim 1, wherein the infill has an infill hull.

3. An air-taxi pod system comprising:
a base having a base hull;
a pod having a pod hull and an air-taxi landing area surrounded by landing lights;
an airship pod, larger than the pod, having an airship pod hull and an airship landing area surrounded by landing lights;
a first stationary spoke disposed between the base and the pod and having a spoke hull and a spoke walkway extending from the pod to the base;
a second stationary spoke disposed between the base and the airship pod and having a spoke walkway extending from the airship pod to the base;
a terminal located on at least one of the base, the pod, the airship pod, the first spoke, or the second spoke;
a dock associated with at least one of the pod, the airship pod, the first spoke, the second spoke, or the base, the dock having a structure that facilitates pedestrian entrance to or exit from a water taxi;
facilities for commuter use or reservation associated with at least one of the pod, the airship pod, the first spoke, the second spoke, or the base;
restaurant space associated with at least one of the pod, the airship pod, the first spoke, the second spoke, or the base;
and an infill having an infill hull connected between the first spoke and the second spoke,
wherein the first spoke and the pod connect through a spoke-pod connection,
wherein the base and the first spoke connect through a spoke-base connection,
wherein the spoke-pod connection and the spoke-base connection are designed to withstand 50 to 100 mile-per-hour winds or waves produced by 50 to 100 mile-per-hour winds, and
wherein the facilities include at least one of a bathroom or a shower.

* * * * *